US010322394B2

(12) United States Patent
Chen

(10) Patent No.: US 10,322,394 B2
(45) Date of Patent: Jun. 18, 2019

(54) CATALYST COMPOSITION WITH MIXED SELECTIVITY CONTROL AGENT AND METHOD

(75) Inventor: Linfeng Chen, Missouri City, TX (US)

(73) Assignee: W. R. Grace & Co.-Conn., Columbia, MD (US)

( * ) Notice: Subject to any disclaimer, the term of this patent is extended or adjusted under 35 U.S.C. 154(b) by 495 days.

(21) Appl. No.: 13/059,495

(22) PCT Filed: Feb. 23, 2009

(86) PCT No.: PCT/US2009/034875
§ 371 (c)(1),
(2), (4) Date: Feb. 17, 2011

(87) PCT Pub. No.: WO2010/021762
PCT Pub. Date: Feb. 25, 2010

(65) Prior Publication Data
US 2011/0152490 A1    Jun. 23, 2011

Related U.S. Application Data

(63) Continuation-in-part of application No. 12/390,785, filed as application No. PCT/US2009/034875 on Feb. 23, 2009, now Pat. No. 7,893,003, which is a continuation-in-part of application No. PCT/US2008/073882, filed on Aug. 21, 2008.

(60) Provisional application No. 60/957,888, filed on Aug. 24, 2007.

(51) Int. Cl.
| | |
|---|---|
| *C08F 4/52* | (2006.01) |
| *C08F 10/06* | (2006.01) |
| *B01J 8/18* | (2006.01) |
| *C08F 10/02* | (2006.01) |
| *C08F 110/06* | (2006.01) |
| *B01J 31/02* | (2006.01) |
| *B01J 31/12* | (2006.01) |
| *B01J 31/14* | (2006.01) |
| *B01J 31/22* | (2006.01) |
| *C08F 210/06* | (2006.01) |

(52) U.S. Cl.
CPC ......... *B01J 8/1872* (2013.01); *B01J 8/1809* (2013.01); *C08F 10/02* (2013.01); *C08F 10/06* (2013.01); *C08F 110/06* (2013.01); *B01J 31/0201* (2013.01); *B01J 31/0212* (2013.01); *B01J 31/0272* (2013.01); *B01J 31/128* (2013.01); *B01J 31/143* (2013.01); *B01J 31/2213* (2013.01); *B01J 31/2226* (2013.01); *C08F 210/06* (2013.01); *C08F 2400/02* (2013.01)

(58) Field of Classification Search
CPC ........................... B01J 31/0209; C08F 10/02
USPC ....................................................... 526/351
See application file for complete search history.

(56) References Cited

U.S. PATENT DOCUMENTS

| | | | |
|---|---|---|---|
| 4,746,762 A | 5/1988 | Avidan et al. | |
| 4,882,380 A | 11/1989 | Ficker et al. | |
| 5,093,415 A | 3/1992 | Brady, III et al. | |
| 5,192,732 A | 3/1993 | Duranel et al. | |
| 5,432,244 A | 7/1995 | Rebhan | |
| 5,453,466 A | 9/1995 | Pellegatti et al. | |
| 5,461,115 A | 10/1995 | Oka | |
| 5,462,999 A | 10/1995 | Griffin et al. | |
| 5,529,850 A | 6/1996 | Morini et al. | |
| 5,652,303 A | 7/1997 | Ishimaru et al. | |
| 5,698,642 A | 12/1997 | Govoni et al. | |
| 5,844,046 A | 12/1998 | Ohgizawa et al. | |
| 6,005,034 A | 12/1999 | Hayashida et al. | |
| 6,087,459 A * | 7/2000 | Miro ................. | C08F 10/06 502/113 |
| 6,214,939 B1 | 4/2001 | Shinozaki et al. | |
| 6,391,985 B1 | 5/2002 | Goode et al. | |
| 6,460,412 B1 | 10/2002 | Cai et al. | |
| 6,576,697 B1 | 6/2003 | Brown | |
| 6,753,390 B2 | 6/2004 | Ehrman et al. | |
| 6,759,489 B1 | 7/2004 | Turkistani | |
| 6,825,146 B2 | 11/2004 | Kilty et al. | |
| 6,900,281 B2 | 5/2005 | Streeky et al. | |
| 7,025,938 B2 | 4/2006 | Olson et al. | |

(Continued)

FOREIGN PATENT DOCUMENTS

| | | |
|---|---|---|
| CN | 87102435 A | 11/1987 |
| CN | 1306544 A | 8/2001 |

(Continued)

OTHER PUBLICATIONS

National Center for Biotechnology Information. PubChem Compound Database; CID=67159838, https://pubchem.ncbi.nlm.nih.gov/compounds/67159838 (accessed Jul. 5, 2017).*
Burdett, I.D., et al., "Gas-Phase Fluidization Technology for Production of Polyolefins", Union Carbide Corporation, 2001.
Cai, P, at al. Effect of Operating Temperature and Pressure on the Transition from Bubbling to Turbulent Fluidization. vol. 5, No. 1 Journal of Chemecial Industry and Engineering (China) 1990.

(Continued)

*Primary Examiner* — Rip A Lee
(74) *Attorney, Agent, or Firm* — Lerner, David, Littenberg, Krumholz & Mentlik, LLP

(57) ABSTRACT

The present disclosure provides a Ziegler-Natta catalyst composition comprising a procatalyst, a cocatalyst and a mixed external electron donor comprising a first selectivity control agent, a second selectivity control agent and an activity limiting agent. A polymerization process incorporating the present catalyst composition produces a high-stiffness propylene-based polymer with a melt flow rate greater than about 50 g/10 min. The polymerization process occurs in a single reactor, utilizing standard hydrogen concentration with no visbreaking.

22 Claims, 1 Drawing Sheet

(56) References Cited

U.S. PATENT DOCUMENTS

| | | | |
|---|---|---|---|
| 7,141,635 B2 | 11/2006 | Chen et al. | |
| 7,226,977 B2 | 6/2007 | Kim et al. | |
| 7,238,758 B2 | 7/2007 | Yoshikiyo et al. | |
| 7,420,021 B2 | 9/2008 | Chen | |
| 7,935,766 B2 * | 5/2011 | Sheard | C08F 10/06 525/323 |
| 8,067,510 B2 * | 11/2011 | Sheard | B01J 8/1809 526/65 |
| 2003/0149196 A1 | 8/2003 | Streeky et al. | |
| 2003/0176611 A1 | 9/2003 | Stevens et al. | |
| 2004/0082750 A1 * | 4/2004 | Tau et al. | 526/348.1 |
| 2004/0127656 A1 | 7/2004 | Bauch | |
| 2005/0143510 A1 | 6/2005 | Nakayama et al. | |
| 2005/0239636 A1 * | 10/2005 | Gao et al. | 502/103 |
| 2006/0167194 A1 * | 7/2006 | Chen et al. | 526/124.1 |
| 2007/0027275 A1 | 2/2007 | Chen | |
| 2007/0032375 A1 | 2/2007 | Campbell et al. | |
| 2007/0224641 A1 | 9/2007 | Campbell | |
| 2007/0270558 A1 | 11/2007 | Scherrer et al. | |
| 2007/0287813 A1 | 12/2007 | Meverden et al. | |
| 2009/0118118 A1 | 5/2009 | Chen et al. | |
| 2009/0209706 A1 * | 8/2009 | Sheard | B01J 8/1809 525/240 |
| 2009/0259006 A1 | 10/2009 | Kobayashi et al. | |
| 2010/0130018 A1 * | 5/2010 | Tokashiki | H01J 37/32082 438/710 |
| 2012/0130018 A1 * | 5/2012 | Sheard et al. | 525/240 |

FOREIGN PATENT DOCUMENTS

| | | | |
|---|---|---|---|
| CN | 1112375 C | 6/2003 | |
| CN | 1612901 A | 5/2005 | |
| CN | 1856514 A | 11/2006 | |
| CN | 1938340 A | 3/2007 | |
| CN | 101835812 A | 9/2010 | |
| EP | 0236082 A2 | 9/1987 | |
| EP | 0385765 | 9/1990 | |
| EP | 0491584 A2 | 6/1992 | |
| EP | 0676419 | 10/1995 | |
| EP | 0728769 | 8/1996 | |
| EP | 0736552 | 10/1996 | |
| EP | 1244717 | 1/2004 | |
| EP | 1980576 | 10/2008 | |
| EP | 1935938 | 6/2009 | |
| JP | 63-243107 | 10/1988 | |
| JP | 3-168224 | 7/1991 | |
| JP | 05-105722 | 4/1993 | |
| JP | 06145269 | 5/1994 | |
| JP | 07-149812 | 6/1995 | |
| JP | 11-255822 | 9/1999 | |
| JP | 2002514666 A | 5/2002 | |
| JP | 2005514499 A | 5/2005 | |
| JP | 2005-232413 A | 9/2005 | |
| JP | 2007-505984 A | 3/2007 | |
| JP | 2007506837 A | 3/2007 | |
| JP | 2007-254671 A | 10/2007 | |
| JP | 2008503602 A | 2/2008 | |
| KR | 0430512 | 7/2004 | |
| WO | 0055215 | 9/2000 | |
| WO | 0109196 A1 | 2/2001 | |
| WO | 0235206 A2 | 5/2002 | |
| WO | 03059966 A1 | 7/2003 | |
| WO | 2005030815 | 4/2005 | |
| WO | 2005035594 A1 | 4/2005 | |
| WO | WO 2005030815 A1 * | 4/2005 | C08F 10/06 |
| WO | 2006067052 | 6/2006 | |
| WO | 2007088887 A1 | 8/2007 | |
| WO | 2009029487 | 3/2009 | |

OTHER PUBLICATIONS

Cai, P., et al., "A Generalized Method for Predicting Gas Flow Distribution between the Phase in FBC", Fluidized Bed Combustion, vol. 2, 1993.

Cui, N. et al. Journal of Applied Polymer Science vol. 99 pp. 1399-1404 published online on Nov. 28, 2005.

International Search Report and Written Opinion for International Patent Application No. PCT/US2009/034875 dated Dec. 14, 2009.

J. Yerushalmi et al., Flow Regimes in Vertical Gas-Solid Contact Systems. The American Institute of Chemical Engineers, No. 176, vol. 74, 1978, pp. 1-13.

Li Youchou et al. The Dynamics of Fast Fluidization. Journal of Chemical Technology and Biotechnology, 34B, 1984, pp. 537-544.

Mori, M et al. Propylene INTEGRAL block copolymers prodn, with good flexibility and impact resistance—comprises catalyst components of magnesium and titanium cpds, organic cpd, and oxygen contg organo:silicon cpd. Thomson Scientific, 1994.

PCT Notification of Transmittal of the International Search Report and the Written Opinion of the International Searching Authority, or the Declaration, dated Feb. 10, 2009 for International Patent Application No. PCT/US2008/073882, filed on Aug. 21, 2008.

PCT Notification of Transmittal of the International Search Report and the Written Opinion of the International Searching Authority, or the Declaration, dated Jul. 8, 2009 for the International Patent Application No. PCT/US2009/034881, filed on Feb. 23, 2009.

PCT/US2008/073877 International Search Report, dated Jul. 3, 2009.

SP. Babu et al., Fluidization Correlations for Coal Gasification Materials—Minimum Fluidization Velocity and Fluidized Bed Expansion Ratio;the American Institute of Chemical Engineers, No. 176, vol. 74, 1978, pp. 176-186.

U.S. Appl. No. 61/141,902, filed Dec. 31, 2008.

SIGMA-ALDRICH, 2,2,4-Trimethyl-1,3-pentanediol dibenzoate, www.sigmaaldrich.com/catalog/product/aldrich/458058?lang=, retrieved Feb. 29, 2016.

SIGMA-ALDRICH, Methyl benzoate, http://www.sigmaaldrich.com/catalog/broductlaldrich/27614?1ang=en&region=US, retrieved, Feb. 29, 2016.

SIGMA-ALDRICH, 1,2-Benzenedimethanol, http://www.sigmaaldrich.com/catalog/broduct/aldrich/184829?1ang= . . . , retrieved Feb. 29, 2016.

Indian Application Serial No. 099/CHENP/2006 filed Mar. 23, 2006 titled "Self-Limiting Catalyst Composition and Propylene Polymerization Process."

* cited by examiner

CATALYST COMPOSITION WITH MIXED SELECTIVITY CONTROL AGENT AND METHOD

PRIORITY CLAIM

This application is a continuation-in-part of application Ser. No. 12/390,785, filed on Feb. 23, 2009, which is now U.S. Pat. No. 7,893,003, which is a continuation-in-part application of International Patent Application No. PCT/US2008/073882 filed on Aug. 21, 2008 which claims priority to U.S. Provisional Patent Applicatiton No. 60/957,888, filed on Aug. 24, 2007, the entire contents of each application are incorporated by reference herein.

BACKGROUND

The demand for high stiffness propylene-based polymers with high melt flow continues to increase as the need for more sophisticated polymers continues to grow. Known are polymer catalyst compositions with a mixture of selectivity control agents (SCAs). Mixed SCAs enable the production of olefin-hased polymers that possess properties contributed from each SCA. However, the use of catalyst compositions with mixed SCAs does not change the highly exothermic nature of the olefin polymerization reaction. The excessive heat generated during polymerization poses a significant risk to the polymerization reactor operability. Excessive heat generation and/or inadequate heat removal can readily disrupt production and/or shut down the reactor.

Desirable would be a catalyst composition for production of high stiffness/high melt flow propylene-based polymers that reduces, or eliminates, the risk of reactor disruption, or shut-down due to excessive heat.

SUMMARY

The present disclosure provides a catalyst composition and polymerization process for the production of a propylene-based polymer with a high melt flow rate and high stiffness. The catalyst composition is self-limiting and exhibits strong hydrogen response with the production of the high melt flow/high stiffness propylene-based polymer under standard polymerization conditions.

The present disclosure provides a catalyst composition. The catalyst composition includes a procataiyst composition, a cocatalyst, and a mixed external electron donor (M-EED). The M-EED includes an activity limiting agent (ALA), a first selectivity control agent (SCA1), a second selectivity control agent (SCA2). SCA1 and SCA2 are present at a mole ratio from 0.1-1.0:1.

In an embodiment, the ALA is selected from an aromatic ester or a derivative thereof, an aliphatic ester or a derivative thereof, a diether, a polyfalkylene glycol) ester, and combinations thereof.

In an embodiment, SCA1 is a dimethoxysilane.

In an embodiment, SCA2 is selected from a diethoxysilane, a triethoxysilane, a tetraethoxysilane, a trimethoxysilane, a diether, a dialkoxybenzene, a dimethoxysilane containing two linear aikyi groups, a dimethoxysilane containing two alkenyl groups, and combinations thereof.

The present disclosure provides a process, In an embodiment, a polymerization process is provided which includes contacting propylene and optionally at least one other olefin with a catalyst composition in a polymerization reactor under polymerization conditions. The catalyst composition includes the procataiyst the cocatalyst and the M-EED. The process further includes forming a propylene-based polymer having a melt flow rate of at least 50 g/10 min.

In an embodiment, the catalyst composition self limits the polymerization reaction.

The present disclosure provides a composition. In an embodiment, a propylene-based polymer Is provided which includes at least 5 ppm of the activity limiting agent. The propylene-based polymer has a melt flow rate greater than about. 50 g/10 min as measured in accordance with ASTM D 1238-01 at 230° C., 2.16 kg.

An advantage of the present disclosure is the provision of an improved catalyst composition.

An advantage of the present disclosure is the provision of an. improved polymerization process.

An advantage of the present disclosure is the provision of an improved propylene-based polymer.

An advantage of the present disclosure is the provision of a catalyst composition that produces a high melt flow/high stiffness propylene-based polymer, the catalyst composition self-limiting the polymerization reaction.

An advantage of the present disclosure is a process for producing a high melt flow/high stiffness propylene-based polymer with standard amounts of hydrogen, without visbreaking.

An advantage of the present disclosure is the provision of a propylene-based polymer with high melt flow with one or more of the following properties: high final melting point, low oligomer content, low or no toxicity, low or no decomposition products, and/or low or no unpleasant odor.

DETAILED DESCRIPTION

Figure 1:
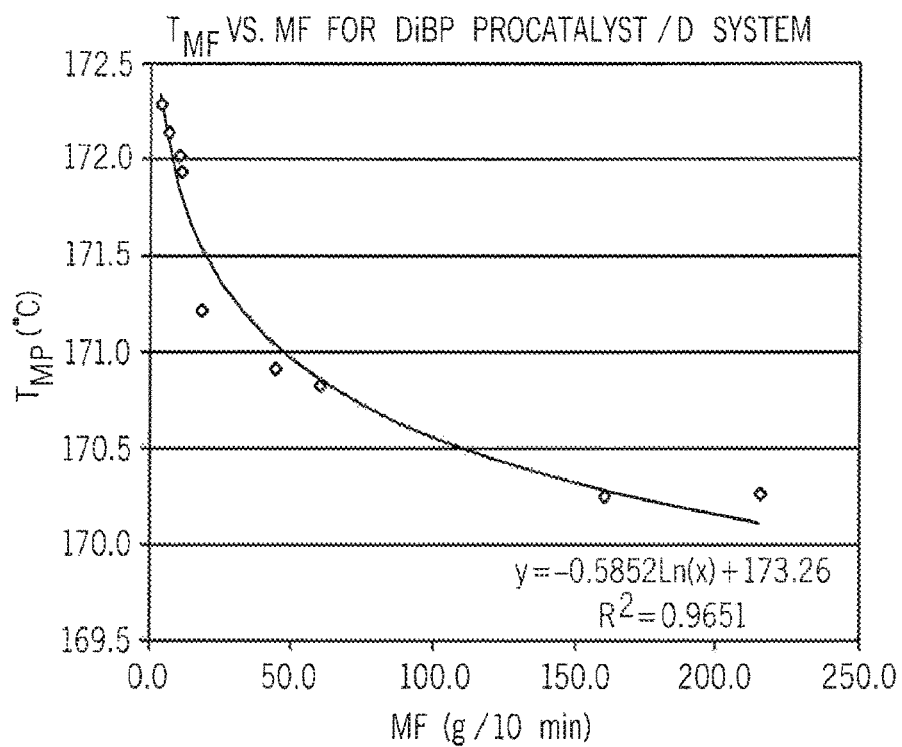
FIG. 1 is a graph showing the final melting temperature and the melt flow rate for a propylene-based polymer.

In an embodiment, a catalyst composition is provided. The catalyst composition includes a procataiyst composition, a cocatalyst, and a mixed external electron donor (M-EED). The M-EED includes a first selectivity control agent (SCA1), a second selectivity control agent (SCA2) and an activity limiting agent (ALA). The M-EED includes a SCA1:SCA2 mole ratio from about 0.1:1 to about 1.0:1.

It is understood that the M-EED may include three or more selectivity control agents (SCA3, SCA4, etc.) and/or two or more ALAs.

The procataiyst composition of the present catalyst composition may be a Ziegler-Natta procataiyst composition. Any conventional Ziegler-Natta procataiyst. may be used in the present catalyst composition. In an embodiment, the Ziegler-Natta procataiyst composition contains a transition metal compound and a Group 2 metal compound. The transition metal compound may be a solid complex derived from a transition metal compound, for example, titanium-, zirconium-, chromium- or vanadium-hydroearbyloxides, hydrocarbyls, halides, or mixtures thereof.

The transition metal compound has the general formula $TrX_x$ where Tr is the transition metal, X is a halogen or a $C_{1-10}$ hydrocarhoxyl or hydrocarhyl group, and x is the number of such X groups in the compound in combination with a Group 2 metal compound, Tr may be a Group 4, 5 or 6 metal. In an embodiment, Tr is a Group 4 metal, such as titanium. X may he chloride, bromide, $C_{1-4}$ alkoxide or phenoxide, or a mixture thereof. In an embodiment, X is chloride.

Nonlimiting examples of suitable transition metal compounds that may be used to form the Ziegler-Natta procatalyst composition are $TiCl_4$, $ZrCl_4$, $HfCl_4$, $TiBr_4$, $TiCl_3$, $Ti(OC_2H_5)_3Cl$, $Zr(OC_2H_5)_3Cl$, $Ti(OC_2H_5)_3Br$, $Ti(OC_3H_7)_2Cl_2$, $Ti(OC_6H_5)_2Cl_2$, $Zr(OC_2H_5)_2Cl_2$, and $Ti(OC_2H_5)Cl_3$. Mixtures of such transition metal compounds may be used as well. No restriction on the number of transition metal compounds is made as long as at least one transition metal compound is present. In an embodiment, the transition metal compound is a titanium compound.

Nonlimiting examples of suitable Group 2 metal compounds include magnesium halides, dialkoxy magnesiums, alkoxymagnesium halides, magnesium oxyhalides, dialkylmagnesiums, magnesium oxide, magnesium hydroxide, and carboxylases of magnesium. In an embodiment, the Group 2 metal compound is magnesium dichloride.

In an embodiment, the Ziegler-Natta procataiyst composition is a mixture of titanium moieties supported on or otherwise derived from magnesium compounds. Suitable magnesium compounds include anhydrous magnesium chloride, magnesium chloride adducts, magnesium dialkoxides or aryloxides, or earboxylated magnesium dialkoxides or aryloxides. In an embodiment, the magnesium compound is a magnesium di($C_{1-4}$)alkoxide, such as diethoxymagnesium.

Nonlimiting examples of suitable titanium moieties include titanium alkoxides, titanium aryloxides, and/or titanium halides. Compounds used to prepare the Ziegler-Natta procataiyst composition include one or more raagnesium-di ($C_{1-4}$)alkoxides, magnesium di halides, magnesium aikoxyhalicles, or mixtures thereof and one or more titanium tetra($C_{1-4}$) alkoxides, titanium tetrahalides, titanium($C_{1-4}$) alkoxyhalides, or mixtures thereof.

A precursor composition may be used to prepare the Ziegler-Natta procataiyst composition as is commonly known in art. The precursor composition may be prepared by the ehlorination of the foregoing mixed magnesium compounds, titanium compounds, or mixtures thereof, and may involve the use of one or more compounds, referred to as "clipping agents", that aid in forming or solubilizing specific compositions via a solid/solid metathesis. Nonlimiting examples of suitable clipping agents include trialkylborates, especially triethylborate, phenolic compounds, especially cresol, and silanes.

In an embodiment, the precursor composition is a mixed magnesium/titanium compound of the formula $Mg_dTi(OR_e)_fX_g$ wherein $R_e$ is an aliphatic or aromatic hydrocarbon radical having 1 to 14 carbon atoms or COR' wherein R' is an aliphatic or aromatic hydrocarbon radical having 1 to 14 carbon atoms: each $OR_3$ group is the same or different; X is independently chlorine, bromine or iodine; d is 0.5 to 56, or 2-4; or 3; f is 2-116, or 5-15, and g is 0.5-116, or 1-3, or 2, The precursor may be prepared by controlled precipitation through removal of an alcohol from the reaction mixture used in its preparation. In an embodiment, the reaction medium comprises a mixture of an aromatic liquid, especially a chlorinated aromatic compound, such as chlorobenzene, with an aikanol, especially ethauol, and an inorganic chlorinating agent. Suitable inorganic chlorinating agents include chlorine derivatives of silicon, aluminum and titanium, such as titanium tetrachloride or titanium trichloride, and titanium tetrachloride in particular. The chlorinating agents lead to partial chlorination which results in a precursor containing relatively high level of alkoxy component(s). Removal of the aikanol from the solution used in the chlorination, results in precipitation of the solid precursor, having a desirable morphology and surface area. The precursor was separated from the reaction media. Moreover, the resulting precursor is particularly uniform particle sized and resistant to particle crumbling as well as degradation of the resulting procatalyst, In an embodiment, the precursor composition is $Mg_3Ti(OEt)_sCl_2$.

The precursor is next converted to a solid procatalyst by further reaction (halogenation) with an inorganic halide compound, preferably a titanium halide compound, and incorporation of an internal electron donor. If not already incorporated into the precursor in sufficient quantity, the internal electron donor may be added separately before, during or after halogenation. This procedure may be repeated one or more times, optionally in the presence of additional additives or adjuvants, and the final solid product washed with an aliphatic solvent. Any method of making, recovering and storing the solid procatalyst is suitable for use in the present disclosure.

One suitable method for halogenation of the precursor is by reacting the precursor at an elevated temperature with a tetravaient titanium halide, optionally in the presence of a hydrocarbon or halohydroearbon diluent. The preferred tetravaient titanium halide is titanium tetrachloride. The optional hydrocarbon or halohydroearbon solvent employed in the production of olefin polymerization procatalyst preferably contains up to 12 carbon atoms inclusive, or up to 9 carbon atoms inclusive. Exemplary hydrocarbons include pentane, octane, benzene, toluene, xylene, alkylbenzenes, and decahydronaphthalene. Exemplary aliphatic halohydroearbons include methylene chloride, methylene bromide, chloroform, carbon tetrachloride, 1,2-dibromoethane, 1,1,2-triehloroethane, triehloroeyclohexane, dichlorofluoromethane and tetrachlorooctane. Exemplary aromatic halohydroearbons include ehlorobenzene, bromobenzene, dichloroberrzenes and chlorotoSuenes. The aliphatic halohydrocarbon may be a compound containing ai least two chloride substiluents such as carbon tetrachloride or 1,1,2-trichloroethane. The aromatic halohydrocarbon may be chlorobenzene or o-chlorotoluene.

The halogenaiion may be repealed one or more times, optionally accompanied by washing with an inert liquid such as an aliphatic or aromatic hydrocarbon or halohydrocarbon between halogena lions and following haiogenation. Further optionally one or more extractions involving contacting with an inert liquid diluent, especially an aliphatic or aromatic hydrocarbon, or aliphatic or aromatic halohydrocarbon, especially at an elevated temperature greater than 100° C. or greater than 110° C. may be employed to remove labile species, especially $TiCl_4$.

In an embodiment, the Ziegler-Natta procataiyst composition includes a solid catalyst component obtained by (i) suspending a diaikoxy magnesium in an aromatic hydrocarbon or halohydrocarbon that is liquid at normal temperatures, (ii) contacting the diaikoxy magnesium with a titanium halide and further (iii) contacting the resulting composition a second time with the titanium halide, and contacting the diaikoxy magnesium with a diester of an aromatic dlcarboxylie acid at some point during the treatment with the titanium halide in (ii).

In an embodiment, the Ziegler-Natta procataiyst composition Includes a solid catalyst component obtained by (i) suspending a precursor material of the formula $Mg_dTi(OR_e)_fX_g$ (as described previously) in an aromatic hydrocarbon or halohydrocarbon that is liquid at normal temperatures, (ii) contacting the precursor with a titanium halide and further (iii) contacting the resulting composition a second time with the titanium halide, and contacting the precursor with a diester of an aromatic dicarboxylic acid at some point during the treatment with the titanium halide in (ii).

The procataiyst composition includes an internal electron donor. As used herein, an "internal electron donor" is a compound added or otherwise formed during formation of the procataiyst composition that donates a pair of electrons to one or more metals present in the resultant procatalyst composition. Not bounded by any particular theory, it is believed that the internal electron donor assists in regulating the formation of active sites, thereby enhancing catalyst stereoselectivity.

In an embodiment, the internal electron donor is a hi dentate compound. A "bidentale compound," as used herein, is a compound containing at least two oxygen-containing functional groups, the oxygen-containing functional groups separated by at least one saturated $C_2$-$C_{10}$ hydrocarbon chain which may optionally contain heteroatom(s). The bidentate compound may be a phthalate, a diether, a succinate, a phenylene dibenzoate, a maieate, a maionate, a glutarate, a dialkoxybenzene, a bis(alkoxyphenyl), a diol ester, a keioester, an alkoxyalkyl ester, a. bis(alkoxyalkyl) fluorene, and any combination thereof.

In an embodiment, the internal electron donor is a phthalate, including diisobutyl phthalate and/or di-n-butyl phthalate.

In an embodiment, the internal electron donor is 9,9-bis (rnethoxymethyl)-9H-fluorene.

In an embodiment, the internal electron donor is a phenylene dibenzoate.

The Ziegler-Natta procatalyst composition may also include an inert support material. The support may be an inert solid which does not adversely alter the catalytic performance of the transition metal compound. Examples include metal oxides, such as alumina, and metalloid oxides, such as silica.

The present catalyst composition includes a cocatalyst The cocatalyst for use with the foregoing Ziegler-Natta procatalyst composition may be an aluminum containing composition. Nonlimiting examples of suitable aluminum containing compositions include organoaluminum compounds, such as trialkylaluraium-, dialkylaiuminum hydride-, alkylaluminurn dihydride-, dialkylaiuminum halide-, alkylaluminumdihalide-, dialkylaiuminum alkoxide-, and alkylaluminurn dialkoxide- compounds containing from 1-10, or 1-6 carbon atoms in each alkyl- or alkoxide-group. In an embodiment, the cocatalyst is a $C_{1-4}$ trialkyl-aluminum compound, such as trieihyialuminum (TEA or TEAl). The molar ratio of aluminum to titanium is 10-200:1, or 35-50:1. In an embodiment, the molar ratio of aluminum to titanium to 45:1.

The present catalyst composition includes a mixed external electron donor (M-EED) which includes a first selectivity control agent (SCA1), a second selectivity control agent (SCA2), and an activity limiting agent (ALA). As used herein, an "external electron donor" (or "EED") is a compound added independent of procataiyst formation that contains at least one functional group that is capable of donating a pair of electrons to a metal atom. Bounded by no particular theory, it is believed that provision of one or more external electron donors in the catalyst composition affects the following properties of the formant polymer: level of tacticity (i.e., xylene soluble material), molecular weight (i.e., melt flow), molecular weight distribution (MWD), melting point, and/or oligomer level.

Nonlimiting examples of suitable compounds for the SCA include silicon compounds, such as alkoxysilanes; ethers and polyethers, such as alkyl-, cycloalkyl-, aryl-, mixed alkyl/aryl-, mixed alkyl/cycloalkyl-, and/or mixed cycloalyl/aryl-ethers and/or polyethers; esters and polyesters, especially alkyl, cycloalkyl- and/or aryl-esters of monocarboxylic or dicarboxylic acids, such as aromatic monocarboxylic- or dicarboxylic-acids; and Group 15 or 16 heteroatom-substituted derivatives of all of the foregoing; and amine compounds, such as cyclic, aliphatic or aromatic amines, more especially pyrrol or pyridine compounds; all of the foregoing SCA's containing from 2 to 60 carbons total and from 1 to 20 carbons in any alkyl or alkylene group, 3 to 20 carbons in any cycloalkyl or cycloalkylene group, and 6 to 20 carbons in any aryl or arylene group.

In an embodiment, SCA1 and/or SCA2 is a silane composition having the general formula (I):

$$SiR_m(OR')_{4-m} \qquad (I)$$

wherein R independently each occurrence is hydrogen or a hydrocarbyl or an amino group, optionally substituted with one or more substituents containing one or more Group 14, 15, 16, or 17 heteroatoms. R contains up to 20 atoms not counting hydrogen and halogen. R' is a $C_{1-20}$ alkyl group, and m is 0, 1, or 2, In an embodiment, R is $C_{6-12}$ aryl, alkyl or aralkyl, $C_{3-12}$ cycloallyl, $C_{3-12}$ branched alkyl, or $C_{3-12}$ cyclic amino group, R' is $C_{1-4}$ alkyl, and m is 1 or 2.

In an embodiment, SCA1 is a dimethoxysilane. The dimethoxysilane may include a dimethoxysilane having at least one secondary alkyl and/or a secondary amino group directly bonded to the silicon atom. Nonlimiting examples of suitable dimethoxysilanes include dicyclopentyldimethoxysilane, methylcyclohexyldimethoxysilane, diisopropyldimethoxy silane, isopropylisobutyldimethoxysilane, diisobutyldimethoxysilane, t-butylisopropyldimethoxysilane, cyclopentylpyrrolidinodiniethoxysilane, bis(pyrrolidino)dimethoxysilane, bis(perhydroisoquinolino)dimethoxysilane, and any combination of the foregoing.

In an embodiment, SCA1 is a stiffness-promoting composition. A "stiffness-promoting composition," as used herein, is a composition that, but for operation according to the process conditions of the present disclosure, increases or otherwise enhances the stiffness of a resulting polymer under the polymerization conditions of interest. Nonlimiting examples of suitable stiffness-promoting include any of the dimethoxysilanes disclosed above.

In an embodiment, SCA1 is dicyclopentyldimethoxysilane.

In an embodiment, the SCA2 is a silicon compound selected from a diethoxysilane, a triethoxysilane, a tetraethoxysilane, a trirnethoxysilane, a dimethoxysilane containing two linear alkyl groups, a dimethoxysilane containing two alkenyl groups, a diether, a dialkoxybenzene, and any combination thereof.

Nonlimiting examples of suitable silicon compounds for SCA2 include dimethyldirnethoxysiiane, vinylmethyldimethoxysilane, n-octylmethyldimethoxysilane, n-octadecylmethyldimethoxysilane, methyldimethoxysilane, 3-chloropropylmethyldimethoxysilane, 2-chloroethylmethyldimethoxysilane, allyldimethoxysilane, (3,3,3-trifluoropropyl)methyldimethoxysilane, n-propylmethyldimethoxysilane, chloromethylmethyldimethoxysilane, di-n-octyldimethoxysilane, vinyl(chloromethyl)dimethoxysilane, methylcyclohexyldiethoxysilane, vinylmethyldiethoxysilane, 1-(triethoxysilyl)-2-(diethoxymethylsilyl)ehtane, n-octylmethyldiethoxysilane, octaethoxy-1,3,5-trisilapentane, n-octadecylmethyldiethoxysilane, methacryloxypropylmethyldiethoxysilane, 2-hydroxy-4-(3-methyldiethoxysilylpropoxy)diphenylketone, (3-glycidoxypropyl)methyldiethoxysilane, dodecylmethyldiethoxysilane, dimethyldiethoxysilane, diethyldiethoxysilane, 1,1-diethoxy-1-silacyclopent-3-ene, chloromethylmethyldiethoxysilane, bis(methyldiethoxysilylpropyl)amine, 3-aminopropylmethyldiethoxysilane, (methacryloxymethyl) methyldiethoxysilane, 1,2-bix(methyldiethoxysilyl)ethane, and diisobutyldiethoxysilane, vinyltrimethoxysilane, vinyltriethoxysilane, benzyltriethoxysilane, butenyltriethoxysilane, (triethoxysilyl)cyclohexane, O-(vinyloxybutyl)-N-triethoxysilylpropylcarbamate, 10-undecenyltrimethoxysilane, n-(3-trimethoxysilylpropyl) pyrrole, N-[5-(trimethoxysilyl)-2-aza-1-oxopentyl]caprolactam, (3,3,3-trifuoropropyl)trimethoxysilane, triethoxysilylundecanal ethylene glycol acetal, (S)-N-triethoxysilylpropyl-O-menthocarbamate, triethoxysilylpropylethylcarbamate, N-(3-triethoxysilylpropyl)4,5-dihydroimidazole, (3-triethoxysilylpropyl-t-butylcarbamate, styrylethyltrimethoxysilane, 2-(4-pyridylethyl)triethoxysilane, n-propyltrimethoxysilane, n-propyltriethoxysilane, (S)-N-1-phenylethyl-N'-triethoxysilylpropylurea, (R)-N-1-phenylethyl-N'-triethoxysilylpropylurea, N-phenylaminopropyltrimethoxysilane, N-phenylaminomethyltriethoxysilane, phenethyltrimethoxysilane, pentyltriethoxysilane, n-octyltrimethoxysilane, n-octyltriethoxysilane, 7-octenyltrimethoxysilane, S-octanoyl)mercaptopropyltriethoxysilane, n-octadecyltrimethoxysilane, n-octadecyltriethoxysilane, methyltrimethoxysilane, methyltriethoxysilane, N-methylaminopropyltrimethoxysilane, 3-methoxypropyltrimethoxysilane, methacryloxymethyltrimethoxysialne, methacryloxymethyltriethoxysilane, and O-(methacryloxyethyl)-N-(triethoxysilylpropyl)carbamate, tetramethoxysilane and/or tetraethoxysilane.

In an embodiment, SCA2 may be methyicyclohexyldiethoxysilane, di-isobutyldiethoxysilane, n-propyltriethoxysilane, tetraethoxysilane, di-n-butyl-dimethoxysilane, benzyltriethoxysilane, but-3-enyltriethoxysilane, 1-(triethoxysilyl)-2-pentene, (triethoxysilyl)cyclohexane, and any combination of the foregoing.

In an embodiment, the SCA2 is selected from a dimethoxysilane containing two linear alkyl groups, a dimethoxysilane containing two alkenyl groups or hydrogen, wherein one or more hydrogen atoms may be substituted by a halogen, and any combination thereof.

In an embodiment, SCA2 may be a diether, a dimer of a diether, a dialkoxybenzene, a dimmer of a diatkoxybenzene, a dialkoxybenzene linked by a linear hydrocarbon group, and any combination thereof. It is noted that the diethers for the ALA set forth below apply equally as nonlimiting examples for the SCA2 diether.

In an embodiment, SCA2 is a melt flow-promoting composition. A "melt flow-promoting composition," as used herein, is a composition that, but for operation according to the process conditions of the present disclosure, increases the melt flow rate of a resulting polymer under the polymerization conditions of interest. The melt-flow promoting composition may be any silane composition suitable as SCA2 as disclosed above, a diether, an alkoxybenzene, an ester, a ketone, an amide, and/or an amine.

In an embodiment, the catalyst composition includes a mole ratio of SCA1 to SCA2 that is less than or equal to 1, or 0.1-1.0:1. In a further embodiment, the SCA1:SCA2 mole ratio is 0.1-0.9:1, or 0.2-0.5:1. Not bounded by any particular theory, it has been found that maintaining the SCA1:SCA2 mole ratio to less than or equal to 1.0, advantageously enables both SCAs to contribute to the properties of the formant propylene-based polymer.

The M-EED includes an activity limiting agent (ALA). An "activity limiting agent," as used herein is a material that reduces catalyst activity at elevated temperature, namely, in a polymerization reactor at polymerization conditions at a temperature greater than about 100° C. Provision of the ALA results in a self-limiting catalyst composition. As used herein, a "self-limiting" catalyst composition is a catalyst composition that demonstrates decreased activity at a temperature greater than about 100° C. In other words, "self-limiting" is the decline of catalyst activity when the reaction temperature rises above 100° C. compared to the catalyst activity under normal polymerization conditions with reaction temperature usually below 80° C. In addition, as a practical standard, if a polymerization process, such as a iluidized bed, gas-phase polymerization running at normal processing conditions is capable of interruption and resulting collapse of the bed with reduced risk with respect to agglomeration of polymer particles, the catalyst composition is said to be "self-limiting."

As a standardized measure of polymerization activity at elevated temperatures for use herein, catalyst activities are adjusted to compensate for different monomer concentrations due to temperature. For example, if liquid phase (slurry or solution) polymerization conditions are used, a correction factor to account for reduced propylene solubility in the reaction mixture at elevated temperatures is included, That is, the catalyst activity is "normalized" to compensate for the decreased solubility compared to the lower temperature, especially a 67° C. standard. The "normalized" activity, at temperature T, or $A_T$, is defined as the measured activity or (weight polymer/weight catalyst/hr) at temperature T, multiplied by a concentration correction factor, $[P(67)]/[P(T)]$, where $[P(67)]$ is the propylene concentration at 67° C. and $[P(T)]$ is the propylene concentration at temperature T. The equation for normalized activity is provided below.

$$\text{Normalized Activity }(A) = \frac{[P(67)]}{[P(T)]} \times \text{Activity}(T)$$

In the equation, the activity at temperature T is multiplied by a ratio of the propylene concentration at 67° C. to the propylene concentration at temperature T. The resulting normalized activity (A), adjusted for the decrease in propylene concentration with temperature increase, may be used for comparison of catalyst activities under varying temperature conditions. The correction factors are listed below for the conditions used in the liquid phase polymerization.

| 67° C. | 85° C. | 100° C. | 115° C. | 130° C. | 145° C. |
|--------|--------|---------|---------|---------|---------|
| 1.00   | 1.42   | 1.93    | 2.39    | 2.98    | 3.70    |

The correction factor assumes that polymerization activity increases linearly with propylene concentration under the conditions employed. The correction factor is a function of the solvent or diluent used. For example, the correction factors listed above are for a common $C_{6-10}$ aliphatic hydrocarbon mixture (Isopar™E, available from Exxon Chemical Company), Under gas phase polymerization conditions, monomer solubility is normally not a factor and activity is generally uncorrected for temperature difference. That is, activity and normalized activity are the same.

The "normalized activity ratio" is defined as $A_T/A_{67}$, where $A_T$ is the activity at temperature T and $A_{67}$ is the activity at 67° C. This value can be used as an indicator of activity change as a function of temperature. For example, an $A_{100}/A_{67}$ equal to 0.30 shows that the catalyst activity at 100° C. is only 30 percent of the catalyst activity at 67° C. It has been found that at 100° C., an $A_{100}/A_{67}$ ratio of 35% or less yields a catalyst system that is a self-limiting system.

The ALA may be an aromatic ester or a derivative thereof, an aliphatic ester or derivative thereof, a diether, a poly (alkylene glycol) ester, and combinations thereof. Nonlimiting examples of suitable aromatic esters include $C_{1-10}$ alkyl or cycloalkyl esters of aromatic monocarboxylic acids. Suitable substituted derivatives thereof include compounds substituted both on the aromatic ring(s) or the ester group with one or more substituents containing one or more Group 14, 15 or 16 heteroatoms, especially oxygen. Examples of such substituents include (poly)alkylether, cycloalkylether, arylether, aralkylether, alkylthioether, arylthioether, dialkylamine, diarylamine, diaralkylamine, and trialkylsilane groups. The aromatic carboxylic acid ester may be a $C_{1-20}$ hydrocarbyl ester of benzoic acid wherein the hydrocarbyl group is unsubstituted or substituted with one or more Group 14, 15or 16 heteroatom containing substituents and $C_{1-20}$ (poly) hydrocarbyl ether derivatives thereof, or $C_{1-4}$ alkyl benzoates and $C_{1-4}$ ring alkylated derivatives thereof, or methyl benzoate, ethyl benzoate, propyl benzoate, methyl p-methoxybenzcate, methyl p-ethoxybenzoate, ethyl p-methoxybenzoate, and ethyl p-ethoxybenzoate. In an embodiment, the aromatic earboxylic acid ester is ethyl p-ethoxybenzoate.

In an embodiment, the ALA is an aliphatic ester. The aliphatic ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be isopropyl myristate and/or di-n-butyl sebaeate.

In an embodiment, the ALA is isopropyl myristate.

In an embodiment, the ALA is a diether. The diether may be a dialkyl diether represented by the following formula.

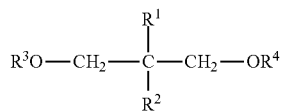

wherein $R^1$ to $R^4$ are independently of one another an alkyl, aryi or aralkyl group having up to 20 carbon atoms, which may optionally contain a group 14, 15, 16, or 17heteroatom, provided that R! and R.2 may be a hydrogen atom. Nonlimiting examples of suitable dialkyl ether compounds include dimethyl ether, diethyl ether, dibutyl ether, methyl ethyl ether, methyl butyl ether, methyl cyclohexyl ether, 2,2-dimethyl-1,3-dimethoxypropane, 2,2-diethyl-1,3-dimethoxypropane, 2,2-di-n-butyl-1,3-dimethoxypropane, 2,2-diisobutyl-1,3-dimethoxypropane, 2-ethyl-2-n-butyl-1,3-diraethoxypropane, 2-n-propyl-2-cyclopentyl-1,3-dimethoxypropane, 2,2-dimethyl-1,3-diethoxypropane, 2 -isopropyl-2-isobutyl-1,3 -dimethoxypropane, 2,2-dicyclopentyl-1, 3-dimethoxypropane, 2-n-propyl-2-cyclohexyl-1,3-diethoxypropane, and 9,9-bis(methoxymethyl)fluorene. In a further embodiment, the dialkyl ether compound is 2,2-diisobutyl-1,3-dimethoxypropane.

In an embodiment, the ALA is a polyfalkylene glycol) ester, Nonlimiting examples of suitable polyfalkylene glycol) esters include polyfalkylene glycol) mono- or diaceiates, poly(alkylene glycol) mono- or di-myristates, poly (alkylene glycol) mono- or di-laurates, poly(alkylene glycol) mono- or di- oleates, glyceryl tri(acetate), glyceryl tri-ester of $C_{2-10}$ aliphatic earboxyiic acids, and any combination thereof. In an embodiment, the polyfalkylene glycol) moiety of the polyfalkylene glycol) ester is a poly(ethylene glycol).

In an embodiment, the molar ratio of aluminum to ALA may be 1.4-85:1, or 2.0-50:1, or 4-30:1. For ALA that contains more than one carboxylate group, all the carboxylate groups are considered effective components. For example, a sebacate molecule contains two carboxylate functional groups is considered to have two effective functional molecules.

In an embodiment, the catalyst composition includes a mole ratio of Al to M-EED of 0.5-25:1, or 1.0-20:1, or 1.5-15:1, or less than about 6, or less than about 5, or less than 4,5.

In an embodiment, the Al:M-EED mole ratio is 0.5-4.0:1. Not wishing to be bound by any particular theory, it is believed that the Al/M-EED mole ratio of 0.5:1 to 4.0: 1provides a sufficient amount of aluminum to support the polymerization reaction at normal polymerization temperatures. However, at elevated temperature (due to a temperature excursion or a process upset, for example), more aluminum species react with other catalyst components. This leads to an aluminum deficiency which slows the polymerization reaction. The aluminum deficiency causes a corresponding reduction in the number of electron donors complexed with the aluminum. The free electron pairs of the non-compiexed donors poison the catalyst system, which self limits the reaction.

As used herein, "total-SCA" is the combined amount (in moles) of SCA1 and SCA2. in other words, total-SCA=SCA1 (mole)+SCA2 (mole). The amount of ALA in M-EED enhances catalyst self-limiting capability at elevated temperature, while the amount of SCA1 provides stiffness and the amount of SCA2 provides melt flow in the resultant polymer. The total-SCA to ALA mole ratio is 0.43-2.33:1, 0.54-1.85:1, or 0.67-1.5:1. The SCA1 to total-SCA mole ratio is 0.2-0.5:1, 0.25-0.45:1, or 0.30-0.40:1. Applicants have surprisingly and unexpectedly discovered that a controlled mole ratio of: (1) SCA1 to SCA2, and/or (2) total-SCA to ALA, and/or (3) SCA1 to total-SCA yields a resultant polymer with the unique properties of high melt flow and high stiffness in conjunction with the operability property of a self-limiting catalyst.

In an embodiment, the mole ratio of total-SCA to ALA is 0.43-2.33:1 and the mole ratio of SCA1 to total-SCA is 0.2-0.5:1.

In an embodiment, the catalyst composition includes a mole ratio of Al to total-SCA of 1.4-85:1, or 2.0-50:1, or 4.0-30:1.

In an embodiment, the catalyst composition includes a mole ratio of total-SCA to ALA that is less than 1,0. Surprisingly and unexpectedly, it has been found that maintaining the mole ratio of total-SCA to ALA to less than 1.0 significantly improves reactor operability.

In an embodiment, the M-EED comprises dicydopentyjdimethoxysilane (SCA1), a melt-flow promoting composition (SCA2), and isopropyl myristate (ALA). In a norther embodiment, SCA2 is selected from methylcyclohexyldiethoxysilane, diisobutyldiethoxysiiane, di-n-butyl-dirnethoxysilane, n-propyltriethoxysilane, benzyltriethoxysilane, but-3-enyltriethoxysilane, 1-(triethoxysilyi)-2-pentene, (triethoxysilyl)cyclohexane, tetraethoxysilane, 1-ethoxy-2-(6-(2-edioxyphenoxy)hexyloxy)benzene, 1-ethoxy-2-n-pentoxybenzene, and any combination thereof.

The mole ratios between various components of the present catalyst composition are set forth below in Table 1.

TABLE 1

| Mole Ratio | Range |
| --- | --- |
| Al to Ti | 10-200:1 |
| Al to M-EED | 0.5-25:1 |
| M-EED to Ti | 1-100:1 |
| Al to total-SCA | 1.4-85:1 |
| Al to ALA | 1.4-85:1 |
| total-SCA to ALA | 0.43-2.33:1 |
| SCA1 to SCA2 | 0.1-1.0:1 |
| SCA1 to total-SCA | 0.2-0.5:1 |

The present catalyst composition may comprise two or more embodiments disclosed herein.

In an embodiment, a polymerization process is provided. The polymerization process includes contacting propylene and optionally at least, one other olefin with a catalyst composition in a polymerization reactor under polymerization conditions. The catalyst composition may be any catalyst composition disclosed herein and includes a procataiyst, a cocatalyst and a mixed external electron donor (M-EED) comprising a first selectivity control agent (SCA1), a second selectivity control agent (SCA2), and an activity limiting agent (ALA). The process also includes forming a propylene-based polymer having a melt flow rate (MLR) of at least 50 g/10 min as measured in accordance with ASTM D 1238-01 test method at 230° C. with a 2.16 kg weight.

In an embodiment, the process includes forming a propylene-based polymer with a MFR greater than 60 g/10 min, or greater than 70 g/10 min, or greater than 80 g/1 0 min, or greater than 100 g/10 nun, or greater than 50 g/ 10 rain to about 1000 g/10 min.

The process includes contacting propylene and optionally at least one other olefin with the catalyst composition in a polymerization reactor. One or more olefin monomers can be introduced into the polymerization reactor along with the propylene to react with the catalyst and to form a polymer, a copolymer, (or a fluidized bed of polymer particles). Nonlimiting examples of suitable olefin monomers include ethylene, $C_{4-20}$ α-olefins, such as 1-butene, 1-pentene, 1-hexene, 4-methyl-1-pentene, 1-heptene, 1-octene, 1-decene, 1-dodecene and the like; C4-20 diolefins, such as 1,3-butadiene, 1,3-pentadiene, norbornadiene, 5-ethylidene-2-norbornene (ENB) and dieyelopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

In an embodiment, the process includes contacting propylene with the catalyst composition to form a propylene homopolymer.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one, polymerization reactor. Accordingly, the polymerization reactor may be a gas phase polymerization reactor, a liquid-phase polymerization reactor, or a combination thereof.

It is understood that provision of hydrogen in the polymerization reactor is a component of the polymerization conditions. During polymerization, hydrogen is a chain transfer agent and affects the molecular weight (and correspondingly the melt flow rate) of the resultant polymer.

In an embodiment, polymerization occurs by way of liquid phase polymerization.

In an embodiment, polymerization occurs by way of gas phase polymerization. As used herein, "gas phase polymerization" is the passage of an ascending fluidizing medium, the fluidizing medium containing one or more monomers, in the presence of a catalyst through a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium, A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. In an embodiment, the fluidizing medium includes propylene gas and at least one other gas such as an olefin and/or a carrier gas such as hydrogen or nitrogen.

In an embodiment, the contacting occurs by way of feeding the catalyst composition into the polymerization reactor and introducing the olefin into the polymerization reactor, In an embodiment, the process includes contacting the olefin with a cocatalyst. The cocatalyst can be mixed with the procataiyst composition (pre-mix) prior to the introduction of the procataiyst composition into the polymerization reactor. In another embodiment, cocatalyst is added to the polymerization reactor independently of the procataiyst composition. The independent introduction of the cocatalyst into the polymerization reactor can occur simultaneously, or substantially simultaneously, with the procataiyst composition feed.

In an embodiment, the process includes mixing or otherwise combining the M-EED with the procataiyst composition. The M-EED can be complexed with the cocatalyst and/or mixed with the procataiyst composition (pre-mix) prior to contact between the catalyst composition and the propylene. In another embodiment, the M-EED (or individual components thereof) may be added independently to the polymerization reactor.

In an embodiment, the process includes maintaining a SCA1:SCA2 mole ratio of 0.1-1.0:1.

In an embodiment, the process is a gas phase polymerization process and includes maintaining a hydrogen-to-propylene ("$H_2/C_3$") mole ratio less than 0.30 (i.e., 0.30:1). or less than 0.20, or less than 0.18, or less than 0.16, or less than 0.08 in a gas phase reactor. Although high melt flow can be achieved by using a high level of hydrogen, it has been found that propylene-based polymers produced by way of a $H_2/C_3$ mole ratio greater than 0.30 significantly accelerate an unwanted reaction of hydrogenation of propylene in the presence of oxidized carbon steel of a reactor and reduce catalyst activity. On the other hand, the resultant propylene-based polymer formed by way of the present process avoids excessive amounts of catalytic residue as the $H_2/C_3$ mole ratio is less than 0.3. In a further embodiment, the process is a gas phase polymerization process as disclosed in copending application Ser. No. 29/060250, filed on Feb. 23, 2009, the entire content of which is incorporated by reference herein.

In an embodiment, the gas phase polymerization process includes maintaining a hydrogen partial pressure below about 80 psi, or below about 71 psi, or below about 63 psi.

In an embodiment, the process includes self-limiting the polymerization process when the temperature in the reactor is greater than about 100° C.

In an embodiment the process includes forming the propylene-based polymer in a single polymerization reactor.

In an embodiment, the process includes forming a propylene-based polymer containing at least about 5 ppm ALA and a MFR greater than about 50 g/10 min. The ALA is present in an amount of at least about 5 ppm, or at least about 10 ppm, or at least about 20 ppm, or at least about 30 ppm, or at least about 5 ppm to about 150 ppm. In a further embodiment, the ALA is isopropyl myristate (IPM).

In an embodiment, the process includes forming a propylene-based polymer containing less than about 200 ppm silicon. In a further embodiment, the process includes forming a propylene-based polymer containing less than 200 ppm, or from about 1 ppm to about 200 ppm, or from about 2 ppm to about 100 ppm dicylcopentyldirnethoxysilane.

Applicants have surprisingly and unexpectedly discovered that die presence of the mixed external electron donor provides a catalyst composition that is self-limiting and produces propylene-based polymers with high stiffness and high melt flow in a single polymerization reactor under standard polymerization conditions. Not wishing to be bound by any particular theory, it is believed that the ALA improves operability in the polymerization reactor by preventing a run-away reaction, polymer sheeting, and/or polymer agglomeration caused by excessive heat. Provision of SCA1 and SCA2 enables the formation of a high stiffness (i.e., $T_{MF}$ greater than about 170° C.)/high melt flow (i.e., greater than 50, or 60, or 70, or 100 g/10 min) propylene-based polymer with utilization of standard hydrogen levels.

In particular, the present process advantageously produces a propylene-based polymer with high stiffness and high melt flow without visbreaking—a conventional technique for increasing the MFR beyond the hydrogen usage limitations of a reactor-grade high stiffness propylene-based polymer as described previously. The term "visbreaking" (or "cracking"), as used herein, is the thermal and/or chemical degradation of a polymer into smaller polymer chain segments. Visbreaking typically includes placing a polymer (such as polypropylene) in a melt state in the presence of a free radical initiator (such as a peroxide) to degrade the polypropylene into smaller polypropylene chain segments.

Visbreaking has many side effects such as formation of decomposition products (which oftentimes cause odor and food incompatibility problems), added cost, and a reduction in polymer stiffness. Visbreaking increases the melt flow yet decreases the weight average molecular weight of a polymer. Visbreaking alters the physical and chemical structure of the initial polymer. For example, a visbroken polypropylene homopolymer will exhibit a reduction in physical and/or mechanical properties (i.e. a lower tensile modulus, a lower flexural modulus) compared to an uncracked propylene homopolymer with the same MFR.

In an embodiment, the present process forms an uncracked propylene-based polymer. A polymer that is "uncracked" has not been subject to a visbreaking procedure. In other words, an uncracked polymer is a non-thermally and/or non-chemically degraded polymer. An uncracked polymer does not exhibit a decline of physical and/or mechanical properties related to molecular weight (such as flexural modulus and/or tensile properties), as does a visbroken polymer at the same MFR. In addition, an uncracked polymer does not experience decomposition products (which oftentimes cause odor and food incompatibility problems) as does a visbroken polymer.

In an embodiment, the process includes forming propylene-based polymer having one or more of the following properties:, (i) an uncracked propylene homopolymer; (ii) a MFR greater than 50 g/10 min, or greater than 60 g/10 min, or greater than 70 g/10 min, or greater than 100 g/10 min ; (iii) a xylene solubles content of less than 4 wt %, or less than 3% wt %, or from about 0.1 wt % to less than 2.0 wt %; (iv) a $T_{MF}$ greater than about 165° C., or greater than 170° C.; (v) an ALA content at least about 5 ppm to about 150 ppm; (vi) a post-reactor oligomer content ("oligomers" are $C_{12}$-$C_{21}$ compounds) less than 3000 ppm, or less than 2500 ppm, or from about 500 ppm to about 3000 ppm; and/or (vii) a post-reactor oligomer content about 10%, or about 20%, or about 40% less than the corresponding oligomer content of a propylene-based polymer formed by a catalyst composition which contains a single stiffness-promoting composition SCA (and optionally an ALA) under similar polymerization conditions. The term "post-reactor oligomer content," as used herein, is the oligomer content of the resultant propylene-based polymer immediately after exit from the polymerization reactor. In other words, "post-reactor oligomer content" is the oligomer content prior to any post-polymerization washing procedure, heating procedure, and/or refining procedure.

The present polymerization process may comprise two or more embodiments disclosed herein.

In an embodiment, a propylene-based polymer is provided. The propylene-based polymer includes at least 5 ppm of an activity limiting agent. The propylene-based polymer has a melt flow rate greater than about 50 g/10 min. The ALA may be present in an amount of at least 5ppm, or at least 10 ppm, or at least 20 ppm, or at least about 30 ppm, or at least about 5 ppm to about 350 ppm. In a further embodiment, the ALA is isopropyl myristate (IPM).

In an embodiment, the propylene-based polymer has a MFR greater than 60 g/10 min, or greater than 70 g/10 min, or greater than 80 g/10 min, or greater than 100 g/10 min, or greater than 50 g/10 min to about 1000 g/10 min.

In an embodiment, the propylene-based polymer is uncracked.

In an embodiment, the propylene-based polymer is a propylene homopolymer.

In an embodiment, the propylene-based polymer includes less than about 200 ppm silicon, or from about 1 ppm to about 200 ppm, or from about 2 ppm to about 100 ppm silicon. In a further embodiment, the propylene-based polymer includes from about 1 ppm to about 200 ppm dicyclopentyldimethoxysilane.

In an embodiment, the propylene-based polymer includes a property selected from: (i) a xylene solubles content of less than about 4 wt %, or less than about 3% wt %, or from about 0,1 wt % to less than about 2.0 wt %; (ii) a $T_{MF}$ greater than about 165° C., or greater than about 170° C.; (iii) a post-reactor oligomer content less than, about 3000 ppm, or less than about 2500 ppm, or from about 500 ppm to about 3000 ppm: and (iv) any combination of (i)-(iii).

In an embodiment, the present propylene-based polymer has low or no toxicity, low or no decomposition products, and/or low or no unpleasant odor.

The present propylene-based polymer may comprise two or more embodiments disclosed herein.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all pans and pereents are based on weight, For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operabiiity, The term "consisting of" excludes any component, step or procedure not specifically delineated or listed. The term "or" , unless stated otherwise, refers to the listed members individually as well as in any combination.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1and 100, it is intended that all individual values, such as. 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt How rate, and other properties.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "polymer" is a macromolecular compound prepared by polymerizing monomers of the same or different type. "Polymer" includes homopoiymers, copolymers, terpolymers, interpoiymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term, "ethylene-based polymer," as used herein, refers to a polymer that comprises a majority weight percent polymerized ethylene monomer (based on the total weight of polymerizable monomers), and optionally may comprise at least one polymerized comonomer.

The term, "propylene-based polymer," as used herein, refers to a polymer that comprises a majority weight percent polymerized propylene monomer (based on the total amount of polymerizable monomers), and optionally may comprise at least one polymerized comonomer.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, 2-propenyl (or allyl), vinyl, n-butyl, t-butyl, i-butyl (or 2-methylpropyl), etc. The alkyls have 1 and 20 carbon atoms.

The term "substituted alkyl," as used herein, refers to an alkyl as just described in which one or more hydrogen atom bound to any carbon of the alkyl is replaced by another group such as a halogen, aryl, substituted aryl, cycloaikyl, substituted cycloalkyl, heteroeyeloalkyl, substituted heteroeyeloalkyl, halogen, haloalkyl, hydroxy, amino, phosphide, alkoxy, amino, thio, nitro, and combinations thereof. Suitable substituted alkyls include, for example, benzyl, trifluoromethyl and the like.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthraeenyl, and biphenyl, among others. The aryls have 1 and 20 carbon atoms.

Test Methods

Flexural modulus is determined in accordance with ASTM D790-00.

Melt flow rate (MFR) is measured in accordance with ASTM D 1238-01 test method at 230° with a 2.16 kg weight for propylene-based polymers.

Xylene Solubles (XS) is measured using a $^1$H NMR method as described in U.S. Pat. No, 5,539,309, the entire content of which is incorporated herein by reference.

Final melting point ($T_{MF}$) is the temperature to melt the most perfect crystal in the sample and is regarded as a measure for isotacticity and inherent polymer crystallizabiity. The test is conducted using a TA Q100 Differential Scanning Calorimeter. A sample is heated from 0° C. to 240° C. at a rate of 80° C./min, cooled at the same rate to 0° C., then heated again at the same rate up to 150° C., held at 150° C. for 5 minutes and the heated from 150° C. to 180° C. at 1.25 ° C./min. The $T_{MF}$ is determined from this last cycle by calculating the onset of the baseline at the end of the heating curve.

Testing procedure:

(1) Calibrate instrument with high purity indium as standard.

(2) Purge the instrument head/ceil with a constant 50 ml/min flow rate of nitrogen constantly.

(3) Sample preparation:

Compression mold 1.5 g of powder sample using a 30-G302H-18-CX Wabash Compression Molder (30 ton): (a) heat mixture at 230° C. for 2 minutes at contact; (b) compress the sample at the same temperature with 20 ton pressure for 1 minute; (c) cool the sample to 45° F. and hold for 2 minutes with 20 ton pressure; (d) cut the plaque into 4 of about the same size, stack them together, and repeat steps (a)-(c) in order to homogenize sample.

(4) Weigh a piece of sample (preferably between 5 to 8 mg) from the sample plaque and seal it in a standard aluminum sample pan, Place the sealed pan containing the sample on the sample side of the instrument head/cell and place an empty sealed pan In the reference side. If using the auto sampler, weigh out several different sample specimens and set up the machine for a sequence.

(5) Measurements:
(i) Data storage: off
(ii) Ramp 80.00° C./min to 240.00° C.
(iii) Isothermal for 1.00 min
(iv) Ramp 80.00° C./min to 0.00° C.
(v) Isothermal for 1.00 min
(vi) Ramp 80.00° C./min to 150.00° C.
(vii) Isothermal for 5.00 min
(viii) Data storage: on
(ix) Ramp 1.25° C./min to 180.00° C.
(x) End of method (6) Calculation: $T_{MF}$ is determined by the interception of two lines. Draw one line from the base-line of high temperature. Draw another line from through the deflection of the curve close to the end of the curve at high temperature side.

Oligomer content testing method: Oligomer content is measured by extracting a polymer sample overnight in a chloroform solution containing n-hexadecane as an internal standard. An aliquot of the extract is shaken with methanol and then filtered to remove any precipitated high molecular weight polypropylene and solid particles. The filtered liquid is injected onto a fused silica capillary chromatography column using cold on-column injection, Relative amounts of the extracted components are calculated based on the weight of polymer extracted.

By way of example and not by limitation, examples of the present disclosure will now be provided.

EXAMPLES

Example 1

(1) Procatalysts:

A. Procatalyst V10B is a commercial SHAC™ 320 catalyst containing 2.52 wt % of Ti and 10.34 wt % of diisobutyl phthalate (DiBP).

B. Procatalyst 1910-29-2 Is prepared according to the procedure for catalyst 4949-25-1 in U.S. Provisional Patent Application No. 61/141,902 filed on Dec. 31, 2008, the entire content of which, is incorporated by reference herein. Procatalyst 1910-29-2contains 3.61 wt % of Ti and 14.85 wt % of 3-methyl-5-tert-butyl-1, 2-phenylene dibenzoate.

(2) External Electron Donor Components:
592420: (triethoxysilyi)cyclohexane
BPIQ—Bis(perhydroisoquinolino)dimethoxysilane
Catepe: 1 -ethoxy-2-n-pentoxybenzene
D (or D donor): dicyclopentyldimethoxysilane
DAB-5: 1-ethoxy-2-(6-(2-ethoxyphenoxy)hexyloxy)benzene
DiBDES: diisobutyldiethoxysilane
DiPDMS—Diisopropyldimethoxysilane
DMDMS—Dimethyidimethoxysilane
DnBDMS: di-n-butyl-dimethoxysiiane
IPM: isopropyl myristate
MChDES: methylcyclohexyldiethoxysilane
MChDMS—Methylcyclohexyldimethoxysilane
PEEB—Ethyl p-Ethoxybenzoate
PTES—n-Propyltriethoxysilane
PTES: n-propyltriethoxysilane
S-191—POE (15) coco fatty acids ester
SIB0971.0: benzyltriethoxysilane
SIB1928.0: benzyltriethoxysilane
TEOS: tetraethoxysilane (3) Polymerization:

A. Liquid Phase Polymerization is performed in liquid propylene in a 1-gallon autoclave. After conditioning, the reactors are charged with 1375 g of propylene and a targeted amount of hydrogen and brought to 62° C. External electron donor component(s) Is added to a 0.27-M triethyiaiuminum solution in isooctane and a 5.0 wt % catalyst slurry in mineral oil (as indicated in data tables below) and premixed at ambient temperature for 20 minutes before being injected into the reactor to initiate the polymerization. The premixed catalyst components are flushed into the reactor with isooctane using a high pressure catalyst injection pump. After the exotherm, the temperature is controlled to 67° C. Total polymerization time is 1 hour.

Figure 2:
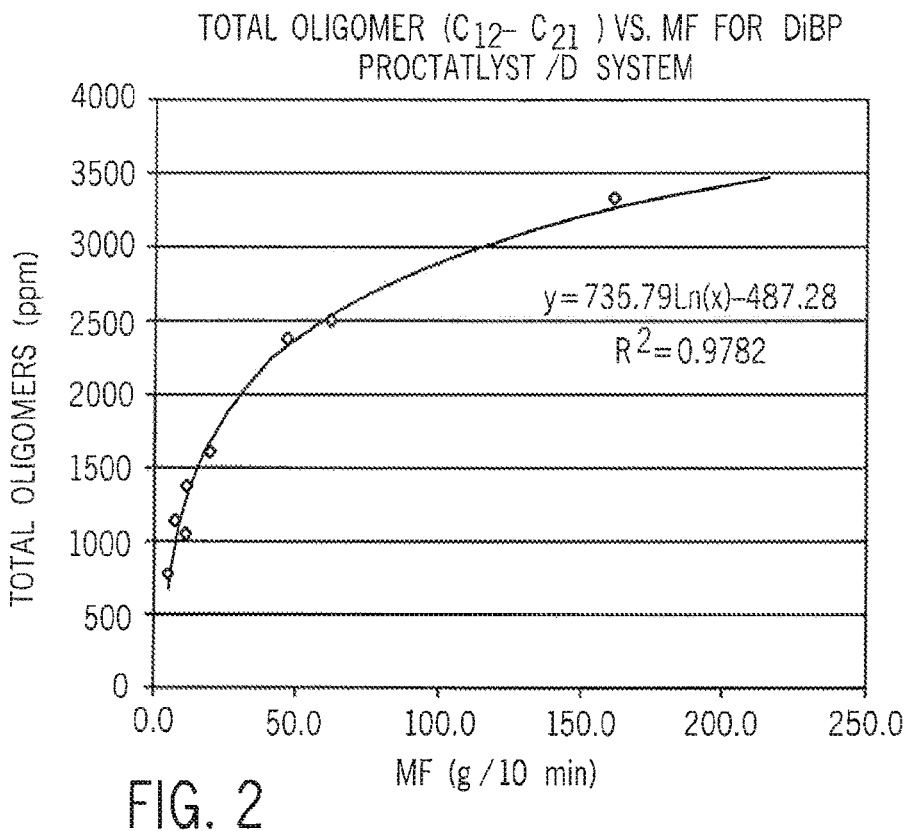
FIG. 2 is a graph showing the oligomer content and the melt flow rate for a propylene-based polymer.

Polymer properties, including xylene solubles (XS), oligomer content, and $T_{MF}$ are melt flow dependent. Procataiyst V10B using D donor as SCA is used as a base line. The results are listed in Table 2. Data in Table 2are used to create standard curves (FIGS. 1 and 2) to generate equations for calculating "standard" value for comparison with polymers produced with catalyst compositions having a M-EED.

TABLE 2

Polymerization Performance and Polymer Properties for DiBP-Procatalyst/D Donor System

| Run Number | Pro-catalyst | SCA | Pro-catalyst (mg) | TEAl (mmol) | SCA (mmol) | $H_2$ (scc) | Activity (kg/g-hr) | MF (min/10 g) | XS (%) | BD (g/cc) | Total Oligomers ($C_{12}$-$C_{21}$) (ppm) | $T_{MF}$ (° C.) |
|---|---|---|---|---|---|---|---|---|---|---|---|---|
| *J-0541 | V10B | D | 8.4 | 1.0 | 0.25 | 3000 | 31.9 | 4.9 | 2.89 | 0.43 | 761 | 172.3 |
| *J-0542 | V10B | D | 8.4 | 1.0 | 0.25 | 4500 | 28.7 | 7.3 | 2.49 | 0.42 | 1134 | 172.2 |
| *J-0543 | V10B | D | 8.4 | 1.0 | 0.25 | 6000 | 32.6 | 11.3 | 2.43 | 0.43 | 1038 | 172.0 |
| *J-0544 | V10B | D | 8.4 | 1.0 | 0.25 | 7500 | 31.3 | 11.9 | 2.39 | 0.43 | 1362 | 171.9 |
| *J-0546 | V10B | D | 8.4 | 1.0 | 0.25 | 10000 | 30.8 | 19.5 | 2.38 | 0.42 | 1602 | 171.2 |
| *J-0547 | V10B | D | 8.4 | 1.0 | 0.25 | 15000 | 37.9 | 45.7 | 2.27 | 0.42 | 2372 | 170.9 |
| *J-0548 | V10B | D | 8.4 | 1.0 | 0.25 | 20000 | 34.4 | 60.9 | 1.77 | 0.40 | 2506 | 170.8 |
| *J-0549 | V10B | D | 8.4 | 1.0 | 0.25 | 30000 | 34.8 | 161.4 | 1.36 | 0.39 | 3320 | 170.3 |
| *J-0550 | V10B | D | 8.4 | 1.0 | 0.25 | 40000 | 23.8 | 216.7 | 1.15 | 0.35 | | 170.3 |

*Comparative

TABLE 3

Polymerization Performance and Polymer Properties for DiBP-Procatalyst/(D + Dialkoxysilane + IPM) System

| Run Number | Pro-catalyst | SCA1/SCA2/ALA | Pro-catalyst (mg) | TEAl (mmol) | SCA1 + SCA2 + ALA (mmol) | SCA1/SCA2/ALA | $H_2$ (scc) |
|---|---|---|---|---|---|---|---|
| *I-0637 | V10B | D/MChDES/IPM | 8.3 | 2.0 | 0.25 | 10/0/15 | 15000 |
| I-0634 | V10B | D/MChDES/IPM | 8.3 | 2.0 | 0.25 | 4/6/15 | 15000 |
| I-0633 | V10B | D/MChDES/IPM | 8.3 | 2.0 | 0.25 | 3.5/6.5/15 | 15000 |
| I-0660 | V10B | D/MChDES/IPM | 8.3 | 2.0 | 0.25 | 2.5/7.5/15 | 15000 |
| *I-0648 | V10B | D/DiBDES/IPM | 8.3 | 2.0 | 0.25 | 10/0/15 | 15000 |
| I-0641 | V10B | D/DiBDES/IPM | 8.3 | 2.0 | 0.25 | 2.5/7.5/15 | 15000 |
| I-0640 | V10B | D/DiBDES/IPM | 8.3 | 2.0 | 0.25 | 2/8/15 | 15000 |
| I-0639 | V10B | D/DiBDES/IPM | 16.7 | 2.0 | 0.25 | 1.5/8.5/15 | 15000 |
| I-0638 | V10B | D/DiBDES/IPM | 8.3 | 2.0 | 0.25 | 1/9/15 | 15000 |
| *O-0610 | V10B | D/DnBDMS/IPM | 8.3 | 2.0 | 0.25 | 10/0/15 | 15000 |
| O-0612 | V10B | D/DnBDMS/IPM | 8.3 | 2.0 | 0.25 | 6.5/3.5/15 | 15000 |
| O-0611 | V10B | D/DnBDMS/IPM | 8.3 | 2.0 | 0.25 | 5/5/15 | 15000 |
| O-0614 | V10B | D/DnBDMS/IPM | 8.3 | 2.0 | 0.25 | 7/10.5/7.5 | 15000 |

| Run Number | Activity (kg/g-hr) | MF (min/10 g) | XS (%) | BD (g/cc) | Total Oligomers ($C_{12}$-$C_{21}$) (ppm) | Total Oligomers ($C_{12}$-$C_{21}$) (D) (ppm) | $T_{MF}$ (° C.) | $T_{MF}$(D) (° C.) |
|---|---|---|---|---|---|---|---|---|
| *I-0637 | 40.7 | 37.1 | 1.66 | 0.41 | | | 171.4 | 171.2 |
| I-0634 | 35.7 | 55.0 | 2.34 | 0.41 | | | 171.0 | 171.0 |
| I-0633 | 39.2 | 60.5 | 2.52 | 0.40 | 1603 | 2455 | 170.5 | 170.9 |
| I-0660 | 39.0 | 85.8 | 2.18 | 0.40 | 1442 | 2699 | 170.5 | 170.7 |
| *I-0648 | 36.5 | 39.0 | 1.88 | 0.39 | 2095 | 2150 | 171.4 | 171.1 |
| I-0641 | 23.0 | 64.1 | 2.38 | 0.35 | | | 170.5 | 171.0 |
| I-0640 | 21.0 | 62.7 | 2.52 | 0.35 | | | 170.8 | 170.9 |
| I-0639 | 19.7 | 80.3 | 2.40 | 0.40 | | | 170.7 | 170.9 |
| I-0638 | 19.5 | 79.0 | 2.96 | 0.35 | | | 170.5 | 170.7 |
| *O-0610 | 10.1 | 39.1 | 1.74 | 0.35 | 1672 | 2152 | 171.8 | 171.1 |
| O-0612 | 32.0 | 57.2 | 2.24 | 0.39 | 1843 | 2417 | 170.9 | 170.9 |
| O-0611 | 21.3 | 71.0 | 2.28 | 0.37 | 1938 | 2567 | 170.4 | 170.8 |
| O-0614 | 24.1 | 90.7 | 2.60 | 0.38 | 1773 | 2738 | 170.8 | 170.7 |

*= Comparative

TABLE 4

Polymerization Performance and Polymer Properties for DiBP-Procatalyst/(D + Trialkoxysilane + IPM) System

| Run Number | Pro-catalyst | SCA1/SCA2/ALA | Pro-catalyst (mg) | TEAl (mmol) | SCA1 + SCA2 + ALA (mmol) | SCA1/SCA2/ALA | $H_2$ (scc) |
|---|---|---|---|---|---|---|---|
| J-0612 | V10B | D/PTES/IPM | 8.3 | 2.0 | 0.25 | 5/5/15 | 15000 |
| J-0611 | V10B | D/PTES/IPM | 8.3 | 2.0 | 0.25 | 4.5/5.5/15 | 15000 |
| J-0609 | V10B | D/PTES/IPM | 8.3 | 2.0 | 0.25 | 3.5/6.5/15 | 15000 |
| J-0608 | V10B | D/PTES/IPM | 8.3 | 2.0 | 0.25 | 3/7/15 | 15000 |
| J-0634 | V10B | D/PTES/IPM | 8.3 | 2.0 | 0.25 | 2.5/7.5/15 | 15000 |
| J-0606 | V10B | D/PTES/IPM | 8.3 | 2.0 | 0.25 | 2/8/15 | 15000 |
| *L-0907 | V10B | D/SIB0971.0/IPM | 7.2 | 2.0 | 0.25 | 10/0/15 | 15000 |
| *L-0911 | V10B | D/SIB0971.0/IPM | 7.2 | 2.0 | 0.25 | 0/10/15 | 15000 |
| L-0904 | V10B | D/SIB0971.0/IPM | 7.2 | 2.0 | 0.25 | 3/7/15 | 15000 |
| L-0906 | V10B | D/SIB1928.0/IPM | 7.2 | 2.0 | 0.25 | 3/7/15 | 15000 |
| *L-0908 | V10B | D/592420/IPM | 7.2 | 2.0 | 0.25 | 0/10/15 | 15000 |
| L-0909 | V10B | D/592420/IPM | 7.2 | 2.0 | 0.25 | 3/7/15 | 15000 |
| *K-0907 | V10B | D/SIB0971.0/IPM | 7.2 | 2.0 | 0.25 | 10/0/15 | 20000 |
| *K-0911 | V10B | D/SIB0971.0/IPM | 7.2 | 2.0 | 0.25 | 0/10/15 | 20000 |
| K-0904 | V10B | D/SIB0971.0/IPM | 7.2 | 2.0 | 0.25 | 3/7/15 | 20000 |
| *K-0905 | V10B | D/SIB1928.0/IPM | 7.2 | 2.0 | 0.25 | 0/10/15 | 20000 |
| K-0906 | V10B | D/SIB1928.0/IPM | 7.2 | 2.0 | 0.25 | 3/7/15 | 20000 |
| *K-0908 | V10B | D/592420/IPM | 7.2 | 2.0 | 0.25 | 0/10/15 | 20000 |
| K-0909 | V10B | D/592420/IPM | 7.2 | 2.0 | 0.25 | 3/7/15 | 20000 |

| Run Number | Activity (kg/g-hr) | MF (min/10 g) | XS (%) | BD (g/cc) | Total Oligomers ($C_{12}$-$C_{21}$) (ppm) | Total Oligomers ($C_{12}$-$C_{21}$) (D) (ppm) | $T_{MF}$ (° C.) | $T_{MF}$(D) (° C.) |
|---|---|---|---|---|---|---|---|---|
| J-0612 | 29.4 | 63.0 | 1.74 | 0.40 | 1436 | 2484 | 170.9 | 170.9 |
| J-0611 | 31.7 | 63.9 | 3.13 | 0.41 | 1973 | 2493 | 171.0 | 170.9 |
| J-0609 | 35.7 | 86.7 | 2.26 | 0.39 | 2289 | 2706 | 170.4 | 170.7 |
| J-0608 | 31.9 | 102.6 | 2.43 | 0.39 | 2345 | 2824 | 170.5 | 170.6 |
| J-0634 | 24.7 | 113.8 | 2.70 | 0.34 | 2182 | 2895 | 170.3 | 170.5 |
| J-0606 | 30.7 | 122.3 | 2.33 | 0.39 | 2332 | 2946 | 170.4 | 170.5 |
| *L-0907 | 28.9 | 32.9 | 1.88 | 0.39 | | | | |
| *L-0911 | 21.7 | 350.5 | 2.57 | 0.34 | | | | |
| L-0904 | 35.8 | 77.7 | (NM) | 0.37 | | | | |
| L-0906 | 29.2 | 76.5 | 2.11 | 0.37 | | | | |
| *L-0908 | 8.8 | 186.1 | 3.26 | 0.32 | | | | |
| L-0909 | 30.7 | 39.8 | 2.12 | 0.34 | | | | |
| *K-0907 | 32.5 | 61.3 | 1.88 | 0.40 | | | | |
| *K-0911 | 25.6 | 663.5 | 2.72 | 0.34 | | | | |
| K-0904 | 43.5 | 150.3 | 1.91 | 0.39 | | | | |
| *K-0905 | 9.2 | 582.8 | 3.32 | 0.32 | | | | |
| K-0906 | 31.3 | 144.1 | 2.24 | 0.38 | | | | |
| *K-0908 | 11.0 | 344.5 | 2.93 | 0.32 | | | | |
| K-0909 | 27.8 | 96.6 | 1.93 | 0.38 | | | | |

*= Comparative

TABLE 5

Polymerization Performance and Polymer Properties for DiBP-Procatalyst/(D + Tetraalkoxysilane + IPM) System

| Run Number | Pro-catalyst | SCA1/SCA2/ALA | Pro-catalyst (mg) | TEAl (mmol) | SCA1 + SCA2 + ALA (mmol) | SCA1/SCA2/ALA | $H_2$ (scc) |
|---|---|---|---|---|---|---|---|
| P-0622 | V10B | D/TEOS/IPM | 8.3 | 2.0 | 0.25 | 5/5/15 | 15000 |
| P-0620 | V10B | D/TEOS/IPM | 8.3 | 2.0 | 0.25 | 4.5/5.5/15 | 15000 |
| P-0619 | V10B | D/TEOS/IPM | 8.3 | 2.0 | 0.25 | 4/6/15 | 15000 |
| P-0617 | V10B | D/TEOS/IPM | 8.3 | 2.0 | 0.25 | 3/7/15 | 15000 |
| P-0616 | V10B | D/TEOS/IPM | 16.7 | 2.0 | 0.25 | 2.5/7.5/15 | 15000 |
| P-0615 | V10B | D/TEOS/IPM | 8.3 | 2.0 | 0.25 | 2/8/15 | 15000 |

TABLE 5-continued

Polymerization Performance and Polymer Properties for DiBP-Procatalyst/(D + Tetraalkoxysilane + IPM) System

| Run Number | Activity (kg/g-hr) | MF (min/10 g) | XS (%) | BD (g/cc) | Total Oligomers ($C_{12}$-$C_{21}$) (ppm) | Total Oligomers ($C_{12}$-$C_{21}$) (D) (ppm) | $T_{MF}$ (° C.) | $T_{MF}$(D) (° C.) |
|---|---|---|---|---|---|---|---|---|
| P-0622 | 37.3 | 71.7 | 2.17 | 0.38 | 1851 | 2574 | 170.8 | 170.8 |
| P-0620 | 38.3 | 75.2 | 2.15 | 0.38 | 2067 | 2607 | 170.5 | 170.8 |
| P-0619 | 38.8 | 82.2 | 2.16 | 0.40 | 1940 | 2669 | 170.6 | 170.7 |
| P-0617 | 28.8 | 109.8 | 1.93 | 0.38 | 1863 | 2871 | 169.6 | 170.6 |
| P-0616 | 36.3 | 120.1 | 2.78 | 0.37 | 2083 | 2933 | 170.1 | 170.5 |
| P-0615 | 16.1 | 165.2 | 2.71 | 0.34 | 1984 | 3155 | 170.0 | 170.3 |

TABLE 6

Polymerization Performance and Polymer Properties for DiBP-Procatalyst/(D + Non-Silane SCA + IPM) System

| Run Number | Procatalyst | SCA1/SCA2/ALA | Procatalyst (mg) | TEAl (mmol) | SCA1 + SCA2 + ALA (mmol) | SCA1/SCA2/ALA | $H_2$ (scc) |
|---|---|---|---|---|---|---|---|
| *O-0616 | V10B | D/DAB-5/IPM | 8.3 | 2.0 | 0.25 | 25/0/0 | 15000 |
| *O-0625 | V10B | D/DAB-5/IPM | 8.3 | 2.0 | 0.25 | 10/0/15 | 15000 |
| O-0622 | V10B | D/DAB-5/IPM | 8.3 | 2.0 | 0.25 | 2/8/15 | 15000 |
| *P-0603 | V10B | D/catepe/IPM | 8.3 | 2.0 | 0.25 | 25/0/0 | 15000 |
| *P-0614 | V10B | D/catepe/IPM | 8.3 | 2.0 | 0.25 | 10/0/15 | 15000 |
| P-0613 | V10B | D/catepe/IPM | 8.3 | 2.0 | 0.25 | 5/5/15 | 15000 |
| P-0611 | V10B | D/catepe/IPM | 8.3 | 2.0 | 0.25 | 3/7/15 | 15000 |
| P-0610 | V10B | D/catepe/IPM | 8.3 | 2.0 | 0.25 | 2/8/15 | 15000 |
| P-0609 | V10B | D/catepe/IPM | 8.3 | 2.0 | 0.25 | 1/9/15 | 15000 |

| Run Number | Activity (kg/g-hr) | MF (min/10 g) | XS (%) | BD (g/cc) | Total Oligomers ($C_{12}$-$C_{21}$) (ppm) | Total Oligomers ($C_{12}$-$C_{21}$) (D) (ppm) | $T_{MF}$ (° C.) | $T_{MF}$(D) (° C.) |
|---|---|---|---|---|---|---|---|---|
| *O-0616 | 19.4 | 30.3 | 1.70 | 0.39 | 2131 | 1973 | 171.7 | 171.3 |
| *O-0625 | 18.4 | 37.0 | 1.64 | 0.37 | 1832 | 2112 | 171.3 | 171.2 |
| O-0622 | 7.1 | 50.0 | 2.69 | 0.34 | 1892 | 2322 | 170.7 | 171.0 |
| *P-0603 | 15.9 | 38.5 | 1.48 | 0.37 | 1868 | 2141 | 171.4 | 171.2 |
| *P-0614 | 38.3 | 38.6 | 1.70 | 0.41 | 2028 | 2143 | 171.3 | 171.2 |
| P-0613 | 32.9 | 81.9 | 2.68 | 0.40 | 2260 | 2666 | 170.0 | 170.7 |
| P-0611 | 31.7 | 161.6 | 3.28 | 0.37 | 2656 | 3140 | 169.1 | 170.3 |
| P-0610 | 28.8 | 201.0 | 3.91 | 0.36 | 2964 | 3292 | 168.5 | 170.2 |
| P-0609 | 11.1 | 197.5 | 3.39 | 0.33 | 1868 | 3280 | 168.3 | 170.2 |

*= Comparative

TABLE 7

Polymerization Performance and Polymer Properties for Non-DiBP-Procatalyst/(D + Tetraalkoxysilane + IPM) System

| Run Number | Procatalyst | SCA1/SCA2/ALA | Procatalyst (mg) | TEAl (mmol) | SCA1 + SCA2 + ALA (mmol) | SCA1/SCA2/ALA | $H_2$ (scc) |
|---|---|---|---|---|---|---|---|
| *O-0953 | 1910-29-2 | D/TEOS/IPM | 4.8 | 2.0 | 0.25 | 25/0/0 | 15000 |
| O-0972 | 1910-29-2 | D/TEOS/IPM | 5.9 | 2.0 | 0.25 | 2.5/7.5/15 | 15000 |

TABLE 7-continued

Polymerization Performance and Polymer Properties for Non-DiBP-Procatalyst/(D + Tetraalkoxysilane + IPM) System

| Run Number | Activity (kg/g-hr) | MF (min/10 g) | XS (%) | BD (g/cc) | Total Oligomers ($C_{12}$-$C_{21}$) (ppm) | Total Oligomers ($C_{12}$-$C_{21}$) (D) (ppm) | $T_{MF}$ (° C.) | $T_{MF}$(D) (° C.) |
|---|---|---|---|---|---|---|---|---|
| *O-0953 | 29.0 | 41.3 | 1.43 | 0.25 | | | | |
| O-0972 | 30.9 | 101.2 | 2.24 | 0.26 | | | | |

*= Comparative

Example 2

(1) Procatalyst: A commercial SFIAC™ 320 catalyst (2.59% Ti) and DiBP is used. Catalyst slurries are prepared in toluene at 0.247 mg/rni. All SCAS and ALAs are diluted to 0.005 M in Isopar E™, except S-191 which is dissolved in toluene before injection into the PPRs. TEA1 is prepared in Isopar E™ and used as either 0.02 or 0.1 M solutions.

(2) Polymerization: Purged Parallel Polymerization Reactors (PPR) are heated to 50° C., TEA1 and Isopar E™ make-up solvent were added to each reactor, followed by the addition of $H_2$ to a stabilized pressure of 5 psig. Reactors are heated to the assigned temperature (67, 100 or 115° C.). Propylene is added to 100 psig and allowed to stabilize for 10 min. To each reactor is added SCA or mixture of SCA1, SCA2 & ALA 500 ul Isopar E™ chaser and immediately followed by the addition of catalyst (275 ul) and a 500 ul Isopar E™ chaser. Reactions are quenched with $CO_2$ after 60 minutes or when the maximum relative conversion of 110 was reached.

(3) Calculation: The concentration of propylene in Isopar E™ in PPRs at various temperatures is calculated. Table 8 below provides normalized activity ratios and illustrates the self-limiting property of the present catalyst compositions. For DMDMS/MChDMS 50/50, the ratio of the normalized catalyst activity at 100° C. to the activity at 67° C., A/A67, is 43% (Table 8). By keeping the DMDMS/MChDMS ratio at 1/1 while replacing 95% of the donor mixture with PEEB, the DMDMS/MChDMS/PEEB 2.5/2.5/95 system showed a ratio A/A67 at 100° C. of 21%. This means that the catalyst system has a significantly lower activity compared to the activity at 67° C. after PEEB was added. That is, the catalyst is more "self-limiting". The same trend is also true for the 115° C. activity.

The self-limiting property of the present catalyst composition is also observed for other SCA1/SCA2/ALA systems composed of aikylalkoxysilanes such as DiPDMS/TEOS, DCPDMS/TEOS, and DCPDMS/MChDMS in the presence of and ALA, such as PEEB. When PEEB is replaced with a poly(alkylene glycol) ester compound, such as S-191, the self-limiting effect is profound (Table 8) even at higher Al/M-EED molar ratio. Similar results are observed when the ALA is isopropyl myristate (1 PM).

TABLE 8

| SCA1 | SCA2 | ALA | Al/(SCA1 + SCA2 + ALA) (mol/mol) | SCA1/SCA2/ALA/Ti (mol/mol/mol) | (SCA1 + SCA2)/ALA (mol %) | Temp (° C.) | Activity (kg/g/hr) | | | Average Activity (kg/g/hr) | Normalized Activity (kg/g/hr) | A/A67 (%) |
|---|---|---|---|---|---|---|---|---|---|---|---|---|
| DMDMS | MChDMS | | 3.0 | 15/15/01 | 100/0 | 67 | 4.51 | 5.19 | | 4.85 | 4.85 | 100 |
| | | | | | | 100 | 1.34 | 0.93 | 0.96 | 1.08 | 2.08 | 43 |
| | | | | | | 115 | 0.31 | 0.21 | 0.28 | 0.27 | 0.64 | 13 |
| DMDMS | MChDMS | PEEB | 3.0 | 0.75/0.75/28.5/1 | 5/95 | 67 | 3.72 | 3.62 | 4.50 | 3.95 | 3.95 | 100 |
| | | | | | | 100 | 0.24 | 0.34 | 0.36 | 0.78 | 0.43 | 0.83 | 21 |
| | | | | | | 115 | 0.03 | 0.01 | 0.01 | 0.04 | 0.02 | 0.05 | 1 |
| DiPDMS | TEOS | | 3.0 | 3/27/0/1 | 100/0 | 67 | 4.22 | 4.01 | | 4.12 | 4.12 | 100 |
| | | | | | | 100 | 0.71 | 0.89 | 1.03 | 0.88 | 1.69 | 41 |
| | | | | | | 115 | 0.24 | 0.14 | 0.22 | 0.20 | 0.48 | 12 |
| DiPDMS | TEOS | PEEB | 3.0 | 0.3/2.7/27/1 | 10/90 | 67 | 2.99 | 3.11 | 3.88 | 3.33 | 3.33 | 100 |
| | | | | | | 100 | 0.22 | 0.26 | 0.31 | 0.41 | 0.30 | 0.58 | 17 |
| | | | | | | 115 | 0.05 | 0.04 | 0.05 | 0.03 | 0.04 | 0.10 | 3 |
| DiPDMS | TEOS | S-191 | 16.7 | 0.3/2.7/27/1 | 10/90 | 67 | 4.00 | 4.26 | 3.36 | 3.87 | 3.87 | 100 |
| | | | | | | 100 | 0.06 | 0.06 | 0.06 | 0.06 | 0.12 | 3 |
| | | | | | | 115 | 0.06 | 0.07 | 0.06 | 0.06 | 0.15 | 4 |
| DCPDMS | TEOS | | 3.0 | 9/21/0/1 | 100/0 | 67 | 3.98 | 4.71 | | 4.35 | 4.35 | 100 |
| | | | | | | 100 | 1.14 | 1.03 | 0.90 | 1.02 | 1.98 | 45 |
| | | | | | | 115 | 0.33 | 0.23 | 0.30 | 0.29 | 0.69 | 16 |
| DCPDMS | TEOS | PEEB | 3.0 | 0.3/2.7/27/1 | 10/90 | 67 | 3.85 | 3.85 | 4.12 | 3.96 | 3.96 | 100 |
| | | | | | | 100 | 0.47 | 0.47 | 0.44 | 0.41 | 0.45 | 0.86 | 22 |
| | | | | | | 115 | 0.08 | 0.08 | 0.07 | 0.08 | 0.08 | 0.19 | 5 |
| DCPDMS | TEOS | S-191 | 16.7 | 0.3/2.7/27/1 | 10/90 | 67 | 4.70 | 5.03 | 3.30 | 4.34 | 4.34 | 100 |
| | | | | | | 100 | 0.06 | 0.06 | 0.07 | 0.06 | 0.12 | 3 |
| | | | | | | 115 | 0.06 | 0.06 | 0.06 | 0.06 | 0.14 | 3 |
| DCPDMS | MChDMS | | 3.0 | 15/15/011 | 100/0 | 67 | 20.44 | 4.94 | 5.60 | 10.33 | 10.33 | 100 |
| | | | | | | 100 | 2.33 | 2.26 | 2.51 | 2.37 | 4.57 | 44 |
| | | | | | | 115 | 0.84 | 0.70 | 0.78 | 0.77 | 1.85 | 18 |
| DCPDMS | MChDMS | PEEB | 3.0 | 0.75/0.75/28.5/1 | 5/95 | 67 | 4.73 | 5.60 | 10.21 | 8.11 | 7.16 | 7.16 | 100 |
| | | | | | | 100 | 0.60 | 0.21 | 0.75 | 0.90 | 0.62 | 1.19 | 17 |
| | | | | | | 115 | 0.08 | 0.10 | 0.07 | 0.07 | 0.08 | 0.19 | 3 |

TABLE 8-continued

| SCA1 | SCA2 | ALA | A1/(SCA1 + SCA2 + ALA) (mol/mol) | SCA1/SCA2/ALA/Ti (mol/mol/mol) | (SCA1 + SCA2)/ALA (mol %) | Temp (° C.) | Activity (kg/g/hr) | | | Average Activity (kg/g/hr) | Normalized Activity (kg/g/hr) | A/A67 (%) |
|---|---|---|---|---|---|---|---|---|---|---|---|---|
| DCPDMS | MChDMS | S-191 | 16.7 | 0.75/0.75/28.5/1 | 5/95 | 67 | 5.34 | 5.66 | 11.72 | 7.57 | 7.57 | 100 |
| | | | | | | 100 | 0.06 | 0.06 | 0.06 | 0.06 | 0.12 | 2 |
| | | | | | | 115 | 0.07 | 0.06 | 0.06 | 0.06 | 0.15 | 2 |
| BPIQ | PTES | | 3.0 | 15/15/0/1 | 100/0 | 67 | 3.33 | 4.17 | | 3.75 | 3.75 | 100 |
| | | | | | | 100 | 1.29 | 1.64 | 1.41 | 1.45 | 2.79 | 74 |
| | | | | | | 115 | 0.46 | 0.54 | 0.38 | 0.46 | 1.10 | 29 |
| BPIQ | PTES | PEEB | 3.0 | 0.75/0.75/28.5/1 | 5/95 | 67 | 4.70 | 2.80 | 4.78 | 4.09 | 4.09 | 100 |
| | | | | | | 100 | 0.43 | 0.62 | 0.23 | 0.43 | 0.82 | 20 |
| | | | | | | 115 | 0.06 | 0.05 | 0.05 | 0.04 0.05 | 0.12 | 3 |
| BPIQ | PTES | S-191 | 16.7 | 0.75/0.75/28.5/1 | 5/95 | 67 | 3.56 | 2.94 | 2.72 | 3.07 | 3.07 | 100 |
| | | | | | | 100 | 0.06 | 0.06 | 0.06 | 0.06 | 0.12 | 4 |
| | | | | | | 115 | 0.06 | 0.06 | 0.06 | 0.06 | 0.14 | 5 |

Catalyst compositions containing an M-EED as disclosed herein are self-limiting systems while simultaneously retaining the advantages of multiple SCAs. Provision of a melt flow-promoting composition such as SCA2 increases the MFR of the resultant polymer. Catalyst compositions with a M-EED produce a polymers with a stiffness substantially the same as, or the same as, the polymer stiffness resulting from a catalyst composition having a stiffness-promoting composition (such as dicylcopentyidimethoxysilane) as the only external electron donor. Provision of a stiffness-promoting composition such as SCA1 produces a polymer with high stiffness as exemplified by the $T_{MF}$-values in Tables 2-7.

Total oligomer content for polymers produced with the present catalyst composition is significantly reduced compared to the oligomer content when a stiffness-promoting composition (such as dicyelopentyldimethoxysilane) is used as the sole external donor at the same melt flow.

The present polymers are not visbroken and have high melt flow, high stiffness as well as low oligomer content, low or no toxicity, and/or low or no decomposition products.

It is specifically intended that the present Invention not be limited to the embodiments and illustrations contained herein, but include modified forms of those embodiments including portions of the embodiments and combinations of elements of different embodiments as come within the scope of the following claims.

I claim:
1. A polymerization process comprising:
contacting propylene and optionally at least one other olefin with a catalyst composition in a polymerization reactor under polymerization conditions, the catalyst composition comprising (i) a procatalyst comprising a phenylene dibenzoate comprising:

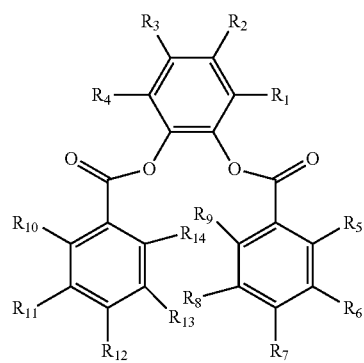

wherein $R_1$-$R_{14}$ are the same or different; each of $R_1$-$R_{14}$ is selected from hydrogen, a substituted hydrocarbyl group having 1 to 20 carbon atoms, an unsubstituted hydrocarbyl group having 1 to 20 carbon atoms, a halogen, or combinations thereof; and at least one of $R_1$-$R_{14}$ is not hydrogen;

(ii) a cocatalyst and (iii) a mixed external electron donor (M-EED) comprising a first selectivity control agent (SCA1), a second selectivity control agent (SCA2) different from SCA1, and an activity limiting agent (ALA), wherein the SCA1:SCA2 mole ratio is less than or equal to 1.0, the total SCA:ALA mole ratio is 0.43-2.33:1, and the SCA1 to total SCA mole ratio is 0.2-0.5:1;

controlling the mole ratio of (1) SCA1 to SCA2, and/or (2) total-SCA to ALA, and/or (3) SCA1 to total SCA; and forming a propylene-based polymer having a melt flow rate of at least 50 g/10 min as measured in accordance with ASTM D 1238-01 at 230° C. with a 2.16 kg weight.

2. The process of claim 1 comprising self-limiting the polymerization when the temperature in the polymerization reactor is greater than about 100° C.

3. The process of claim 1 comprising forming a propylene-based polymer comprising at least about 5 ppm ALA.

4. The process of claim 1 comprising forming an uncracked propylene-based polymer.

5. The process of claim 1 wherein the SCA1 is a dimethoxysilane.

6. The process of claim 1 wherein the SCA1 is dicyclopentyldimethoxysilane.

7. The process of claim 1 wherein the SCA2 is a triethoxysilane.

8. The process of claim 1 wherein the ALA is a $C_4$-$C_{30}$ aliphatic acid ester.

9. The process of claim 1 wherein the ALA is isopropyl myristate.

10. The process of claim 1 wherein the phenylene dibenzoate is 3-methyl-5-tert-butyl-1,2-phenylene dibenzoate.

11. The process of claim 1 comprising forming a propylene-based polymer having a melt flow rate of greater than 60 g/10 min as measured in accordance with ASTM D 1238-01 at 230° C. with a 2.16 kg weight.

12. The process of claim 1 comprising forming a propylene-based polymer having a melt flow rate of greater than 70 g/10 min as measured in accordance with ASTM D 1238-01 at 230° C. with a 2.16 kg weight.

13. The process of claim 1 comprising forming a propylene-based polymer having a melt flow rate of greater than 100 g/10 min as measured in accordance with ASTM D 1238-01 at 230° C. with a 2.16 kg weight.

14. The process of claim 1 comprising forming a propylene-based polymer having a xylene solubles content of less than 3%.

15. The process of claim 1 wherein the phenylene dibenzoate is 3-methyl-5-tert-butyl-1,2-phenylene dibenzoate, the SCA1 is dicyclopentyldimethoxysilane, the SCA2 is a triethoxysilane and the ALA is isopropylmyristate.

16. The process of claim 1, forming the propylene-based polymer to include at least 5 ppm ALA.

17. The process of claim 1, wherein the catalyst composition includes Al, and the process further comprises controlling a mole ratio of Al to total SCA1, SCA2 and ALA in the range of 0.5-25:1.

18. The process of claim 1, wherein SCA1 comprises a dimethoxysilane compound and SCA2 comprises a diethoxysilane compound.

19. A polymerization process comprising:

contacting propylene and optionally at least one other olefin with a catalyst composition in a polymerization reactor under polymerization conditions, the catalyst composition comprising (i) a procatalyst comprising a phenylene dibenzoate comprising:

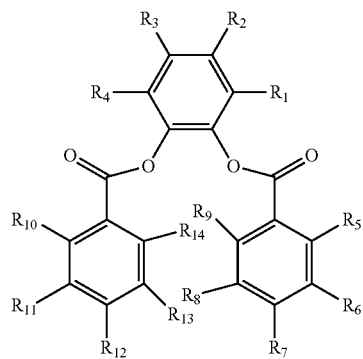

wherein at least one of $R_1$-$R_4$ is selected from an unsubstituted hydrocarbyl group having 2 to 20 carbon atoms and or a substituted hydrocarbyl group having 2 to 20 carbon atoms; each of the other R groups of $R_1$-$R_4$ is hydrogen; and each of $R_5$-$R_{14}$ is selected from hydrogen, an unsubstituted hydrocarbyl group having 1 to 20 carbon atoms, a substituted hydrocarbyl group having 1 to 20 atoms, a halogen, and or combinations thereof;

(ii) a cocatalyst and (iii) a mixed external electron donor (M-EED) comprising a first selectivity control agent (SCA1), a second selectivity control agent (SCA2) different from SCA1, and an activity limiting agent (ALA), wherein the SCA1:SCA2 mole ratio is less than or equal to 1.0, the total SCA:ALA mole ratio is 0.43-2.33:1, and the SCA1 to total SCA mole ratio is 0.2-0.5:1;

controlling the mole ratio of (1) SCA1 to SCA2, and/or (2) total-SCA to ALA, and/or (3) SCA1 to total SCA; and forming a propylene-based polymer having a melt flow rate of at least 50 g/10 min as measured in accordance with ASTM D 1238-01 at 230° C. with a 2.16 kg weight.

20. The process of claim 19, forming the propylene-based polymer to include at least 5 ppm ALA.

21. The process of claim 19, wherein the catalyst composition includes Al, and the process further comprises controlling a mole ratio of Al to total SCA1, SCA2 and ALA in the range of 0.5-25:1.

22. The process of claim 19, wherein SCA1 comprises a dimethoxysilane compound and SCA2 comprises a diethoxysilane compound.

* * * * *